(12) United States Patent
Borzenko

(10) Patent No.: US 6,963,855 B1
(45) Date of Patent: Nov. 8, 2005

(54) APPARATUS AND METHOD FOR AUTOMATED DISPLAY OF MARKET ACTIVITY

(76) Inventor: Alexander Borzenko, 499 Park Ave. Suite 22, Ridgewood, NY (US) 10022

( * ) Notice: Subject to any disclaimer, the term of this patent is extended or adjusted under 35 U.S.C. 154(b) by 0 days.

(21) Appl. No.: 09/545,974

(22) Filed: Apr. 10, 2000

(51) Int. Cl.$^7$ .............................................. G06F 17/60
(52) U.S. Cl. ....................................................... 705/37
(58) Field of Search ............................... 705/37, 36, 35; 273/256; 345/762, 828, 111, 473, 2.2, 501, 88; 707/102, 5; 440/539.1, 84, 75, 86, 1; 340/984; 318/588

(56) References Cited

U.S. PATENT DOCUMENTS

| | | | |
|---|---|---|---|
| 3,573,747 A | | 4/1971 | Adams et al. |
| 3,581,072 A | | 5/1971 | Nymeyer |
| 3,865,380 A | * | 2/1975 | Thomas ....................... 273/256 |
| 3,976,840 A | | 8/1976 | Cleveland et al. |
| 4,243,844 A | | 1/1981 | Waldman |
| 4,412,287 A | | 10/1983 | Braddock, III |
| RE31,643 E | | 8/1984 | Waldman |
| 4,585,130 A | | 4/1986 | Brennan |
| 4,588,192 A | | 5/1986 | Laborde |
| 4,674,044 A | | 6/1987 | Kalmus et al. |
| 4,677,552 A | | 6/1987 | Sibley, Jr. |
| 4,750,135 A | | 6/1988 | Boilen |
| 4,751,640 A | | 6/1988 | Lucas et al. |
| 4,903,201 A | | 2/1990 | Wagner |
| 4,949,248 A | | 8/1990 | Caro |
| 5,025,372 A | | 6/1991 | Burton et al. |
| 5,038,284 A | | 8/1991 | Kramer |
| 5,101,353 A | | 3/1992 | Lupien et al. |
| 5,136,501 A | | 8/1992 | Silverman et al. |
| 5,168,446 A | | 12/1992 | Wiseman |
| 5,267,148 A | | 11/1993 | Kosaka et al. |
| 5,270,922 A | | 12/1993 | Higgins |
| 5,297,031 A | | 3/1994 | Gutterman et al. |
| 5,297,032 A | * | 3/1994 | Trojan et al. ........... 340/825.26 |
| 5,339,392 A | | 8/1994 | Risberg et al. |
| 5,361,199 A | | 11/1994 | Shoquist et al. |
| 5,375,055 A | | 12/1994 | Togher et al. |
| 5,500,889 A | | 3/1996 | Baker et al. |
| 5,508,913 A | | 4/1996 | Yamamoto et al. |
| 5,517,406 A | | 5/1996 | Harris et al. |
| 5,557,517 A | | 9/1996 | Daughtery, III |
| 5,563,783 A | | 10/1996 | Stolfo et al. |
| 5,640,569 A | | 6/1997 | Miller et al. |
| 5,655,088 A | | 8/1997 | Midorikawa et al. |
| 5,689,651 A | * | 11/1997 | Lozman ....................... 705/37 |
| 5,689,652 A | | 11/1997 | Lupien et al. |
| 5,727,165 A | | 3/1998 | Ordish et al. |
| 5,752,237 A | | 5/1998 | Cherny |

(Continued)

FOREIGN PATENT DOCUMENTS

| | | | | |
|---|---|---|---|---|
| WO | WO 98/45830 | * | 10/1998 | ........... G09F/27/00 |

OTHER PUBLICATIONS

NPL—PR Newswire, Nov. 3, 1999 "Streamer Free Real-time Stock Quote Service Registers 12,000 users" (web page—findarticles.com/m4PRN/1999_Nov_3/57153236/p1/article.jhtml), 3 pages.*

Primary Examiner—Hyung Sough
Assistant Examiner—Harish T. Dass

(57) ABSTRACT

Thermographs and top mover lists as displays of market motion. Displays for time-dependent information. Thermographs comprising display areas on computer screens, the display areas divided into cells, tick times for a security stored in memory, color values calculated for each tick time and displayed in contiguous cells in the display area. Lists of top moving securities identified by calculation of security momenta comprising differences between a current time and tick times, the differences being summed.

72 Claims, 23 Drawing Sheets

U.S. PATENT DOCUMENTS

| | | | |
|---|---|---|---|
| 5,774,880 A | 6/1998 | Ginsberg | |
| 5,788,234 A | 8/1998 | Siofer | |
| 5,799,287 A | 8/1998 | Dembo | |
| 5,806,048 A | 9/1998 | Kiron et al. | |
| 5,809,483 A | 9/1998 | Broka et al. | |
| 5,819,237 A | 10/1998 | Garman | |
| 5,819,238 A | 10/1998 | Fernholz | |
| 5,844,532 A * | 12/1998 | Silverbrook et al. | 345/89 |
| 5,845,266 A | 12/1998 | Lupien et al. | |
| 5,852,808 A | 12/1998 | Cherny | |
| 5,857,176 A | 1/1999 | Ginsberg | |
| 5,875,108 A | 2/1999 | Hoffberg et al. | |
| 5,901,246 A | 5/1999 | Hoffberg et al. | |
| 5,905,974 A | 5/1999 | Fraser et al. | |
| 5,924,083 A | 7/1999 | Silverman et al. | |
| 5,940,810 A | 8/1999 | Traub et al. | |
| 5,946,667 A | 8/1999 | Tull, Jr. et al. | |
| 5,950,176 A | 9/1999 | Keiser et al. | |
| 5,999,918 A * | 12/1999 | Williams et al. | 702/179 |
| 6,006,206 A * | 12/1999 | Smith et al. | 705/35 |
| 6,014,643 A * | 1/2000 | Minton | 705/26 |
| 6,134,535 A * | 10/2000 | Belzberg | 705/36 |
| 6,408,282 B1 * | 6/2002 | Buist | 705/37 |
| 6,587,840 B1 * | 7/2003 | Smith et al. | 705/35 |

* cited by examiner

```
//Data Representing Ticks data structure struct Arrays
{
        306  { time_t UpTicks[12];    /*290*/
              { time_t DownTicks[12]; /*292*/
} struct DataRepresentingTicks  /*112*/
{
        string symbol;
        Arrays bid;
        Arrays ask;
}
```

```
// t():   function transform the tick times stored in the time array into color values
//        t is called periodically to transform and display the color values void t(TimeArray TickTimes)
    {
            // CutOff is the maximum time difference allowed
            // BeginColor is the starting color for display
            //EndColor is the ending color for the display
            for i = first element to last element
            {
                    ColorValue= f(Ticktimes[i], CutOff, BeginColor, EndColor);
                    display(ColorValue)
            }
    }

//f():     function transforms time value into color color f(time TickTime, Time Diff CutOff, color begin, color end)
{
time curtime=now();
Time Diff diff=Curtime - TickTime;
if(diff<0)diff=0;
if(diff>CutOff)diff=CutOff;
          // the time difference calculated cannot be more than the cutoff return RGB(   lt(diff,0,CutOff,RED(begin),RED(end)),
                  lt(diff,0,CutOff,GREEN(begin),GREEN(end)),
                  lt(diff,0,CutOff,BLUE(begin),BLUE(end)));

}

//lt():    function does linear transformation [X1,X2] -> [Y1,Y2]
// calculates the value between the begin and end color values that correspond
     to the time difference value float lt(float x, float X1,float X2,float Y1, float Y2)
    {
        float y= (( Y2 - Y1)/(X2-X1)) * (x - X1) + Y1;
        return y;
    }

//RGB():  function builds a color value from its given red, green and blue components
//RED(), GREEN(),BLUE():      functions extract particular color component from
```

*FIG. 5*

Struct Movement ⸺803
{                  ⸺804
    char    Symbol[4] : // identify security
    time_t TickTimes[12]; // stores the tick times for the security identified by  } 802
              806 ⸺            // symbol
}

CalculateSecurityMomentum(Movement *pTickSecurity)
{

{
        int     i,delta, SecurityMomentum =0;
        time_t      CurrentTime = time ();

for(i=0; i<12; i++))
        {
            delta = CurrentTime - pTickSecurity -> tick_times[i];
            if(delta>12) break;   // exit for ()
            SecurityMomentum +=12- delta;
        }
        return (SecurityMomentum);
    }

*FIG. 9B*

```
Generate_List_Top_Movers()
    // the function caclulate_security_momentum() accepts a security and calculates its security
        //momentum value
{
    RecievedSecurityMomentum = CalculateSecurityMomentum( RecievedSecurity);
    BottomListedSecurityMomentum =
                CalculateSecurityMomentum(SecuritiesList[BottomOfList]);
    If RecievedSecurityMomentum > BottomListedSecuritymomentum
    {
        SecuritiesList[BottomOfList] = ReceivedSecurity;
            // place received security on bottom of list
        for index = BottomOfList to TopOfList
        {
            //this loop bubbles the received sercurity to the top of the list
            CurrentSecurityMomentum =
                        CalculateSecurityMomentum(SecuritiesList[index-1]);
            If RecievedSecurityMomentum > CurrentSecurityMomentum
            // received security is always in SecuritiesList[index]
            Then
                    Swap positions of SecuritiesList[index-1] and SecuritiesList[index]
            Else break the loop
        }
    }
}
```

*FIG. 9E*

```
//Data Representing Ticks data structure
                     ┌─1206
struct TickDirection
{                        ┌─1208
        time_t UpTicks[12];
        time_t DownTicks[12];
}                        └─1210

┌─1108
struct DataRepresentingTicks
{
        string symbol;  ┌─1210
        TickDirection bid;  ⎫
        TickDirection ask;  ⎬1208
                            ⎭
}                       └─1212
```

```
                       ┌1704
struct DataRepresentingTick
    {           ┌1740
    char    Symbol[4] ; // identify security
    time_t  TickTimes[12]; // stores the tick times for the security identified
              └1306            // by symbol
    }
```

US 6,963,855 B1

APPARATUS AND METHOD FOR AUTOMATED DISPLAY OF MARKET ACTIVITY

BACKGROUND OF THE INVENTION

The present invention relates to displays of time-dependent information. More particularly, the invention relates to automated methods and apparatus for display of information related to the motion of fast-moving markets.

Viewed according to their interest in information regarding fast-moving markets, investors can be classified in three broad categories. First, there are traditional investors. Traditional investors trade approximately once a month. Traditional investors are interested in long term investment. Traditional investors may have very little concern with high-speed information because traditional investors, intending to hold a stock for months or years, may be content to pay any price in a stock's daily trading range. Despite the long-term nature of traditional investing, however, as more information about execution quality and timeliness becomes available to the investing and trading public, even traditional investors become more interested in displays helpful for interpreting A fast-moving markets.

The second category of investors is hyperactive investors. Hyperactive investors are serious hobbyists or enthusiasts rather than professional investors. They do not earn their living exclusively from investing. They have other professions or occupations, but they are focally interested in the process of investing. Hyperactive investors-trade approximately once daily, about twenty times more often than traditional investors. Hyperactive investors are often interested in popular stocks in which they may remain invested for relatively short periods of time, perhaps only a few days or hours. As more information about execution quality and timeliness becomes available to the investing or trading public, hyperactive investors become more interested in displays helpful in interpreting fast-moving markets. Hyperactive investors increasingly demand a high quality of information regarding market motion.

The third category of investors is day traders. Day traders are full-time, individual, professional securities traders. Day traders generally may make thirty to fifty trades a day, perhaps fifty times as many trades as hyperactive investors and a thousand times as many as traditional investors. Day traders probably account for about fifteen percent of the trading volume on Nasdaq. For day traders, quality of execution is a matter of financial survival, crucially important. A delay in execution of even a few seconds can cause a loss for a day trader because markets can change so quickly. Prior art displays of symbols with associated price changes become practically useless to day traders, especially at times of rapid price change. A displayed price can change so quickly that the changes are impossible to follow with the human eye. Moreover, it is the publicized demands of day traders for advanced trading aids, coupled with increased availability over the Internet, that increases the interest of hyperactive investors and traditional investors in availability of such aids.

Systems have begun to appear that give day traders the ability to transmit orders through brokers' systems directly to market makers selected by the day traders themselves. Such systems may provide day traders information, such as latency and transaction costs for each market, that is helpful in deciding how to select markets. Such systems do address the problems of speed of execution. Nevertheless, day traders still often rely on their natural human reaction times to perceive market trends, estimate price trends in fast-moving markets, and chase stocks with orders entered by hand through a keyboard. Markets often move so rapidly that the human eye can not follow price changes displayed on a computer.

Many markets accept limit orders only. As a stock becomes more volatile, it becomes increasingly difficult to purchase for a limit price. By the time the day trader reads the quote on his screen and gets his finger to the keyboard to press the 'buy' button, the shares offered at the inside price already have been sold. By the time the trader selects another market and enters another order at a higher limit price, those share can already have been sold, and so on.

Thus there is a need for advanced apparatus and methods for displaying information indicating in more useful ways market motions represented by time-dependent measures. The present invention provides such apparatus and methods. The present invention is described primarily in terms of displays of market information, but persons skilled in the art will recognize that the invention in many embodiments will be used to implement displays for other types of time-dependent information.

SUMMARY

In a first aspect of the invention, a display is provided depicting market activity, the display comprising a display area disposed on a display screen, information indicative of market activity displayed in the display area, the information being dependent upon market data and tick times. In this aspect of the invention, the display area is typically divided into at least one display cell. In some embodiments of this aspect, the information indicative of market activity comprises color values dependent upon market data and upon tick times, the color values being displayed as colors in the display area.

In other embodiments, the information indicative of market activity comprises a list of top moving securities comprising a predetermined number of securities, and further comprising a security occupying a bottom position in the list ("the bottom listed security"). In such embodiments, the display comprises automated computing machinery that computes, for each security identified by a symbol in data representing a tick ("the tick security"), a security momentum. The automated computing machinery in such embodiments also computes a comparison of the security momentum of the tick security and the security momentum of the bottom listed security, replacement of the bottom listed security with the tick security if the security momentum of the tick security is greater than the security momentum of the bottom listed security, thereby including the tick security in the list. The automated computing machinery also computes, if the tick security is included in the list, a comparison of the security momentum of the tick security and the security momentum of a security just above the tick security in the list, and an exchange of the positions of the tick security and the security just above the tick security in the list if the security momentum of the tick security is greater than the security momentum of the security just above the tick security in the list.

In embodiments implementing lists of top moving securities, when computing a security momentum, the automated computing machinery also computes a time difference between a current time and stored tick times and a sum of the time differences so computed.

In a further aspect of the invention, a method is provided for representing market activity, wherein market data dependent upon market activity is received in a data stream through a communications port. The method comprises the steps of storing data representing a tick and creating a display dependent upon the data representing a tick. The method, in further embodiments, when data representing a tick is received, includes also storing the data representing a tick, this step further comprising storing the time the data representing the tick was received ("tick time") in a time array having a number of ordered elements including a first element and a last element.

In such embodiments, the method includes shifting the contents of the time array toward the last element, thereby emptying the first element and overwriting the last element; and storing the tick time in the first element. The method in further embodiments includes creating a display comprising calculating a color value for each tick time stored in the time array, the color values being dependent upon the corresponding tick times. In such embodiments, the method includes periodically displaying colors corresponding to the color values.

In such embodiments, the method includes creating a display by retrieving from computer memory the tick time stored in each element of the time array, transforming each tick time in the time array into a color value, and displaying each color value onto a computer screen.

In a still further aspect of the invention, there is provided a method creating a display comprising generating a list of top moving securities dependent upon data representing a tick, the list comprising at least one listed security and a bottom listed security. In this aspect of the invention, data representing a tick is received and generating a list further comprises calculating from the stored tick times a security momentum for the security identified by the symbol in the data representing the tick ("the tick security"), said security momentum being a numeric indication of relative security price motion; and generating a list of securities having the highest security momenta. In many embodiments of this aspect of the invention, calculating from the stored tick times a security momentum includes calculating time differences between a current time and stored tick times and summing the calculated time differences.

In further embodiments of this aspect of the invention, generating a list of securities with the highest security momentums calculating the security momentum for the security just above the tick security on the list; and comparing the security momentum of the security just above the tick security and the security momentum of the tick security. In such embodiments, generating a list further includes, when the comparison shows that the security momentum of the tick security is greater than the security momentum of the security just above the tick security on the list, swapping the positions of the tick security and the security just above the tick security on the list.

Such embodiments also repeat the steps of calculating the security momentum for the security just above the tick security on the list, comparing the security momentum of the security just above the tick security and the security momentum of the tick security, and, when the comparison shows that the security momentum of the tick security is greater than the security momentum of the security just above the tick security on the list, swapping the positions of the tick security and the security just above the tick security on the list.

In a further aspect of the invention, a system for representing market activity is implemented in software on a digital computer, wherein the market activity is represented by a data stream, received through a communications port, and the system comprises means for storing data representing a tick; and means for creating a display dependent upon the data representing a tick.

In some embodiments of this aspect of the invention, means for creating a display further comprises means for generating a list of top moving securities dependent upon the data representing a tick, the list comprising at least one listed security and a bottom listed security. In such embodiments, when data representing a tick is received, means for generating a list further comprises, means for calculating from stored tick times a security momentum for the security identified by the symbol in the data representing the tick ("the tick security"), said security momentum being a numeric indication of relative security price motion, and means for generating a list of securities having the highest security momenta.

Further embodiments of this aspect of the invention provide means for calculating from the stored tick times a security momentum, including means for calculating time differences between a current time and stored tick times; and means for summing the calculated time differences.

DRAWINGS

FIG. 5 is an example of pseudo-code for transforming tick times into color values.

Figure 6:
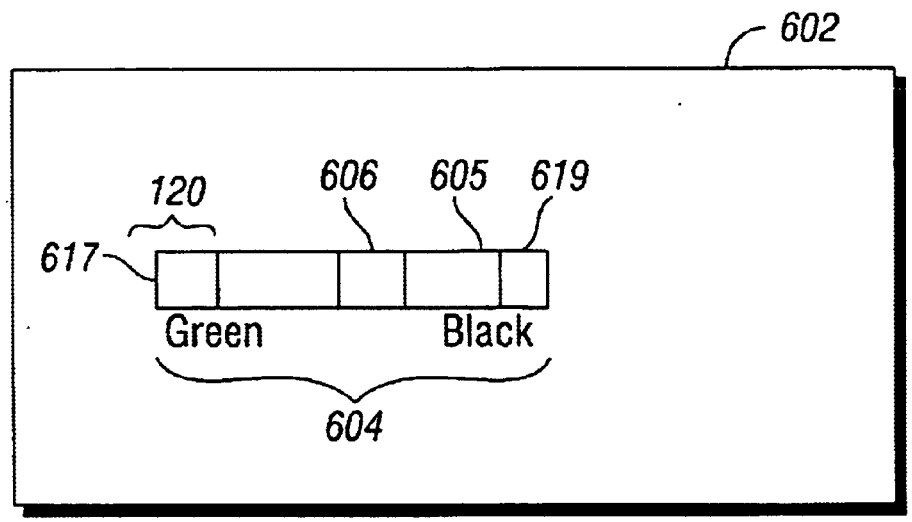
FIG. 6 is an illustration of a thermograph displayed on a computer screen.
Figure 6A:
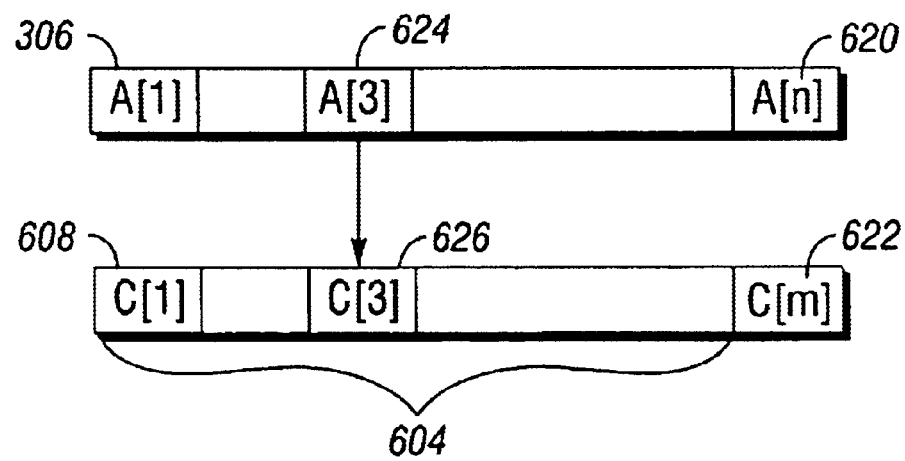

FIG. 6A diagrams the relationship between a time array and a display area of a thermograph on the computer screen.

Figure 6B:
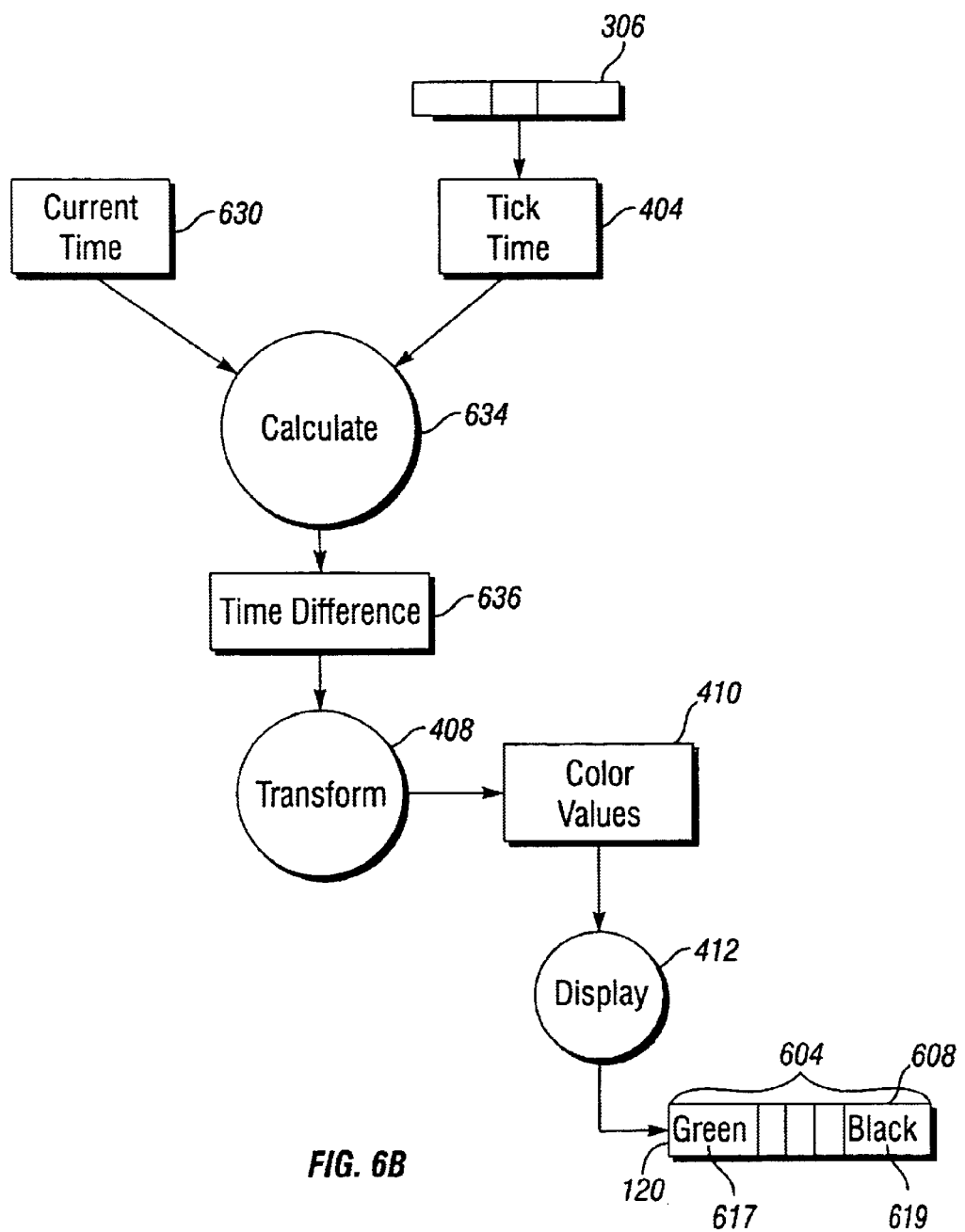

FIG. 6B is an example diagram of steps involved in calculating time differences.

Figure 7A:
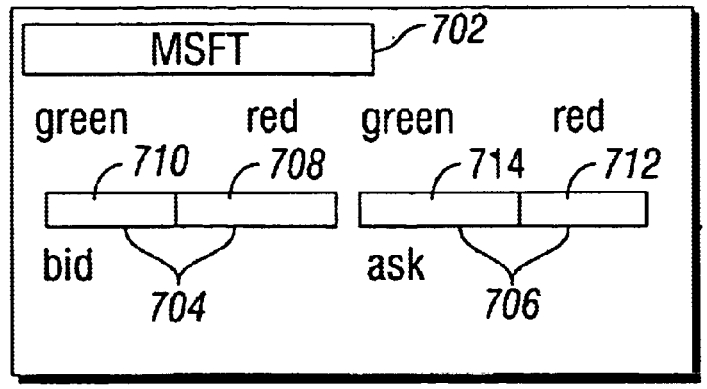

FIG. 7A is an example of thermographs displaying up ticks and down ticks on both sides.

Figure 7B:
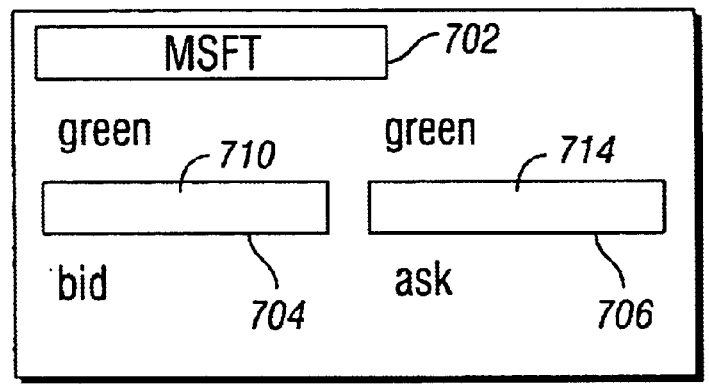

FIG. 7B is an example of thermographs displaying up ticks on both sides.

Figure 7C:
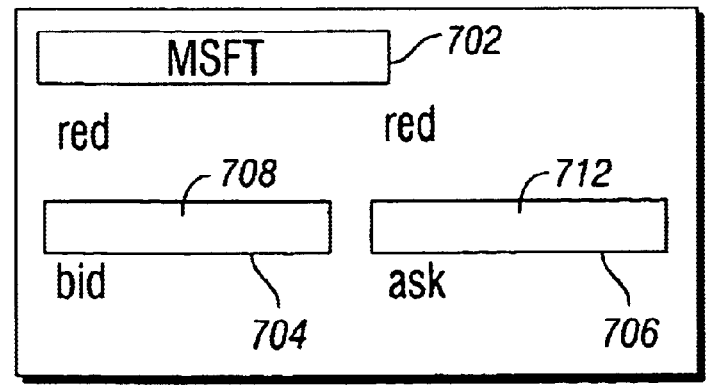

FIG. 7C is an example of thermographs displaying down ticks on both sides.

Figure 7D:
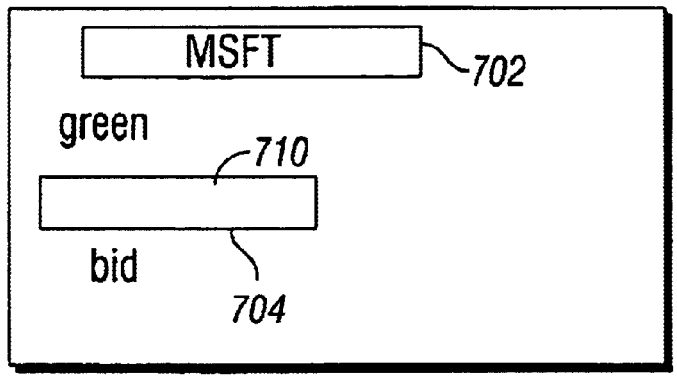

FIG. 7D is an example of a thermograph displaying up ticks on the bid side.

Figure 7E:
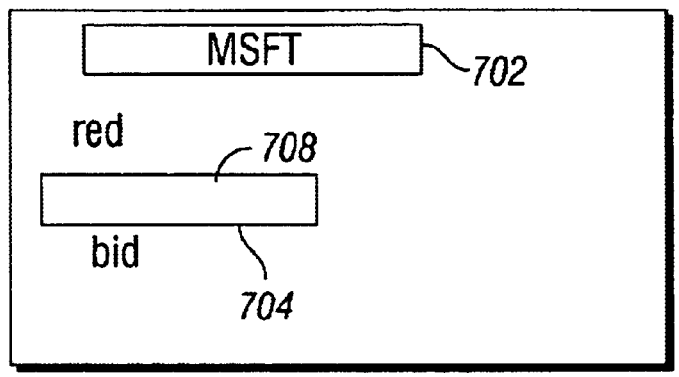

FIG. 7E is an example of a thermograph displaying down ticks on the bid side.

Figure 7F:
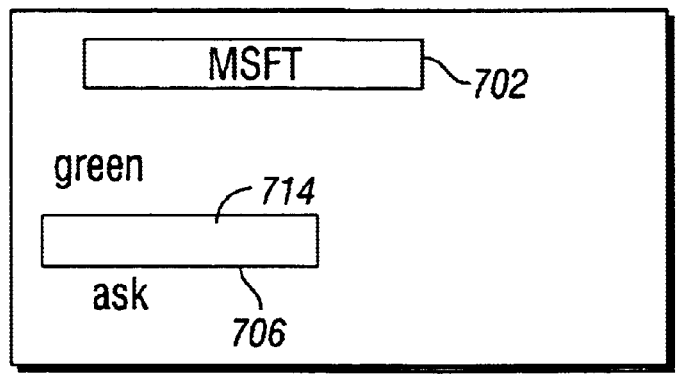

FIG. 7F is an example of a thermograph displaying up ticks on the ask side.

Figure 7G:
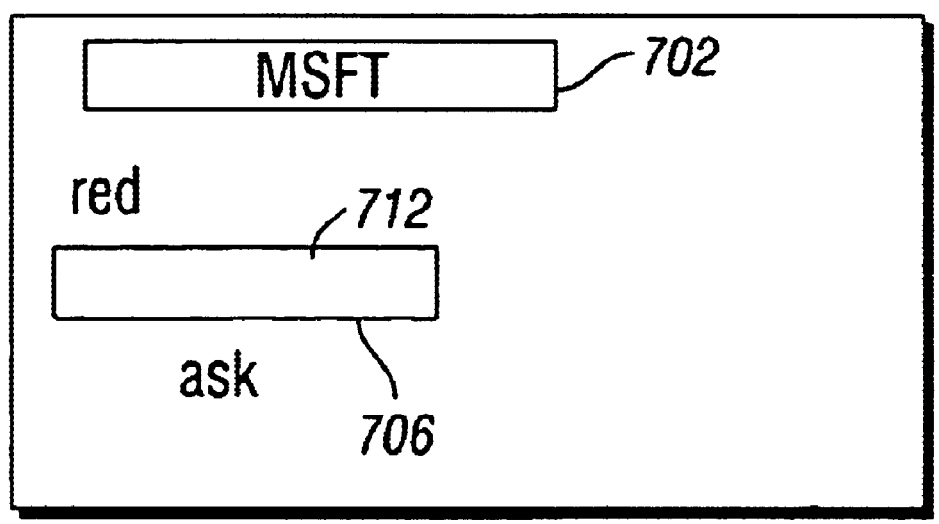

FIG. 7G is an example of a thermograph displaying down ticks on the ask side.

Figure 8:
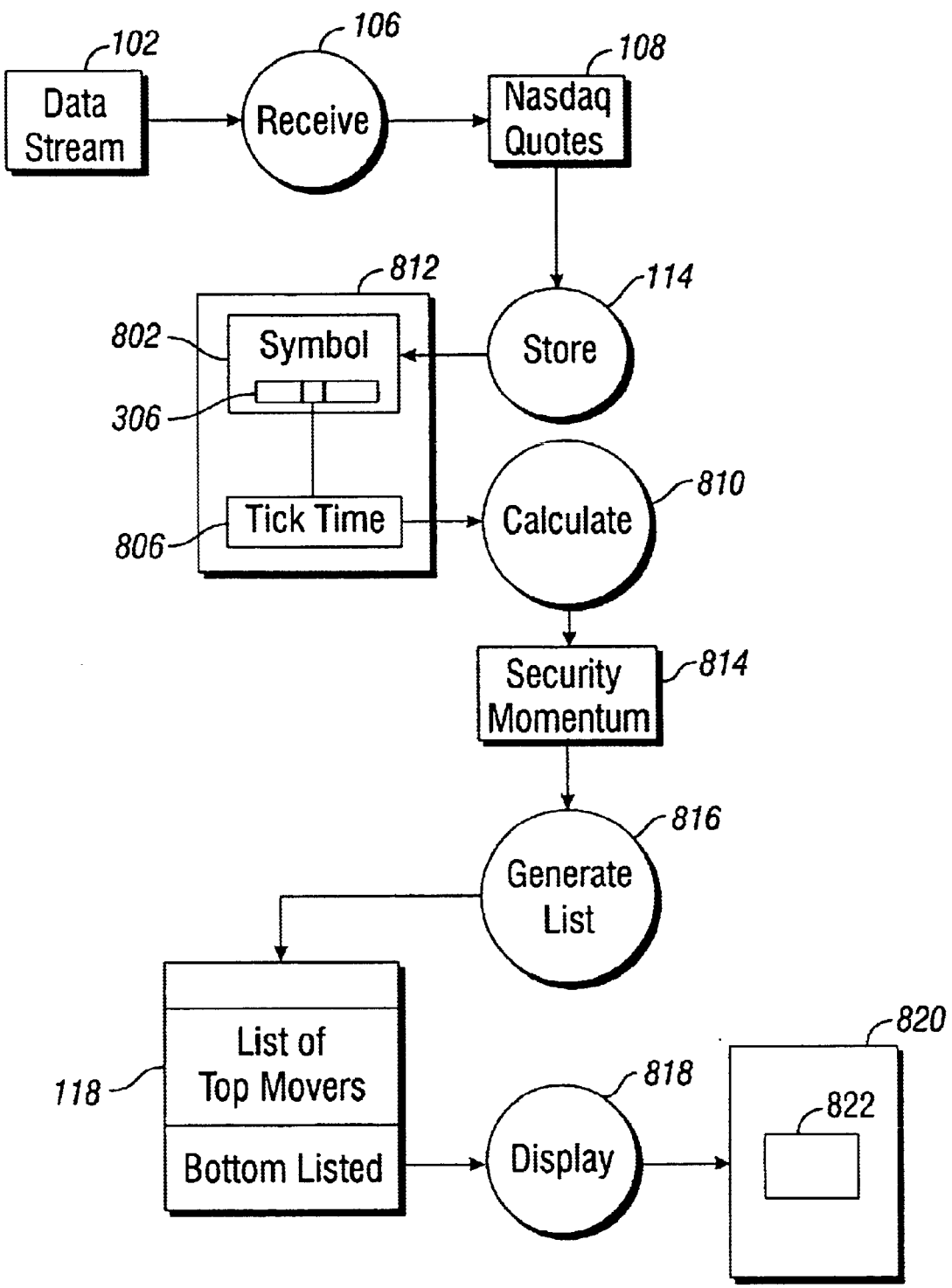

FIG. 8 is a diagram of steps in displaying the list of top moving securities.

Figure 9A:
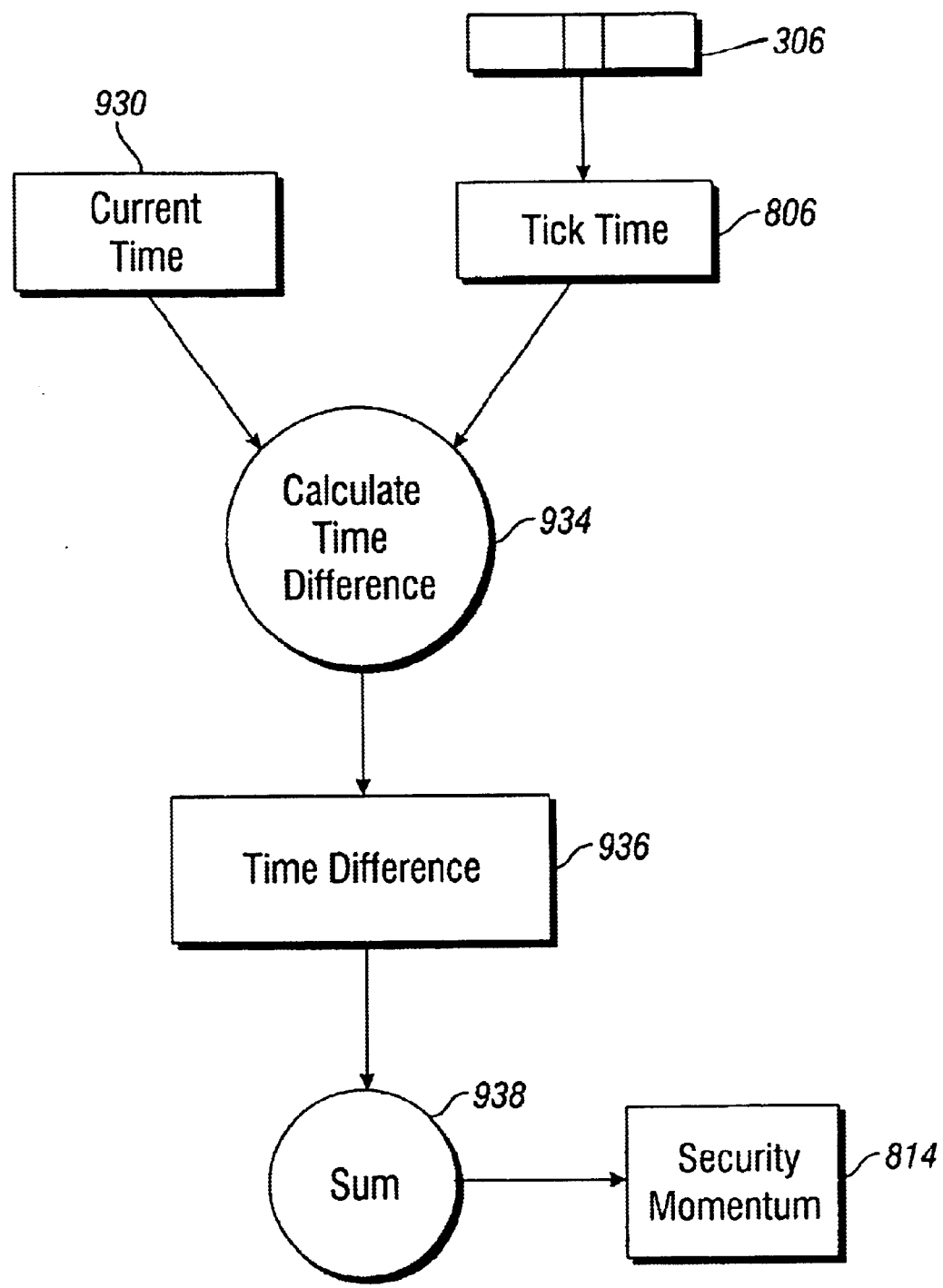

FIG. 9A is a diagram of steps involved in calculating a security momentum.

FIG. 9B is example pseudo-code for calculating a security momentum.

Figure 9C:
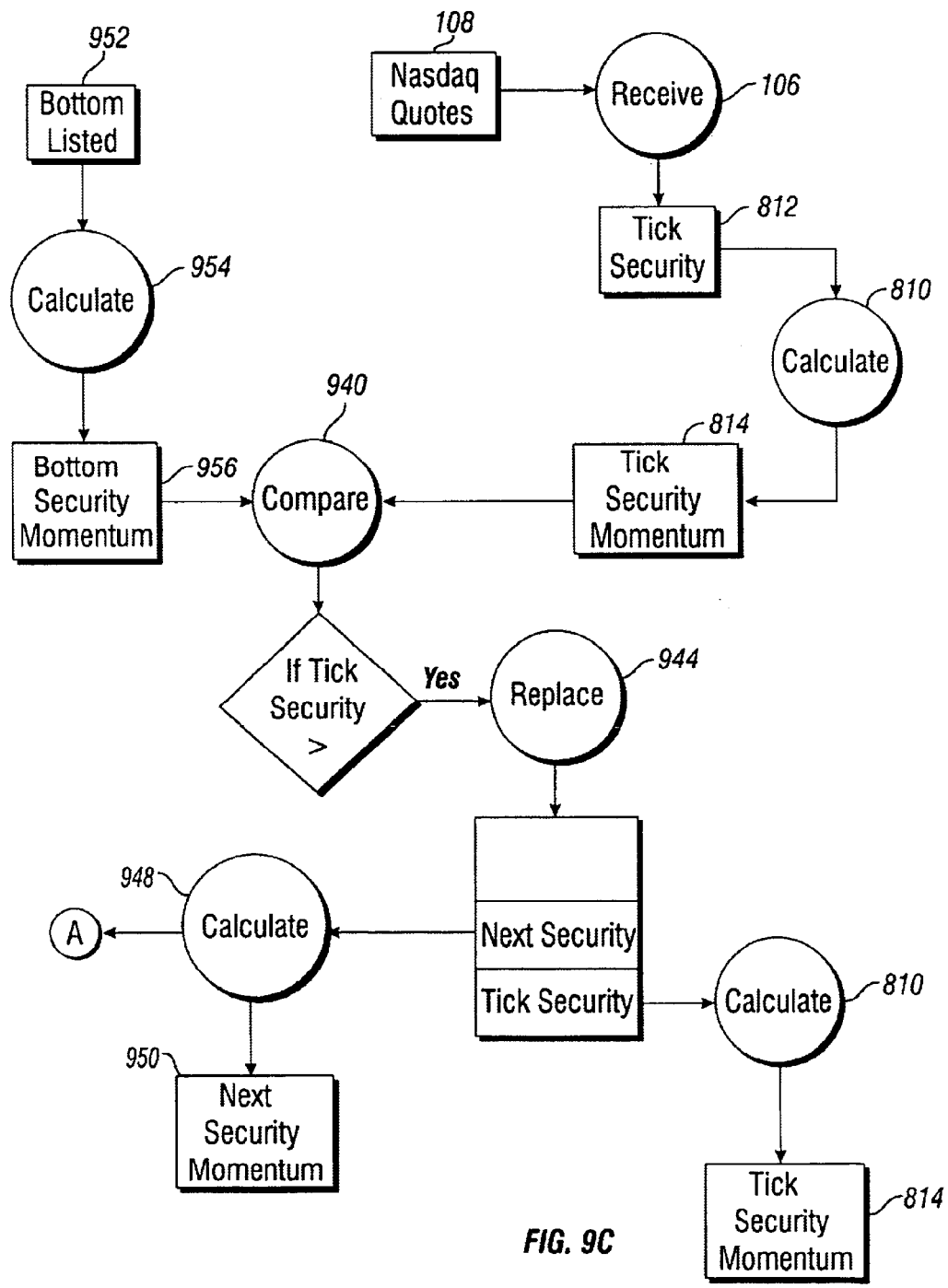

FIGS. 9C illustrates steps involved in generating the list of top moving securities.

Figure 9D:
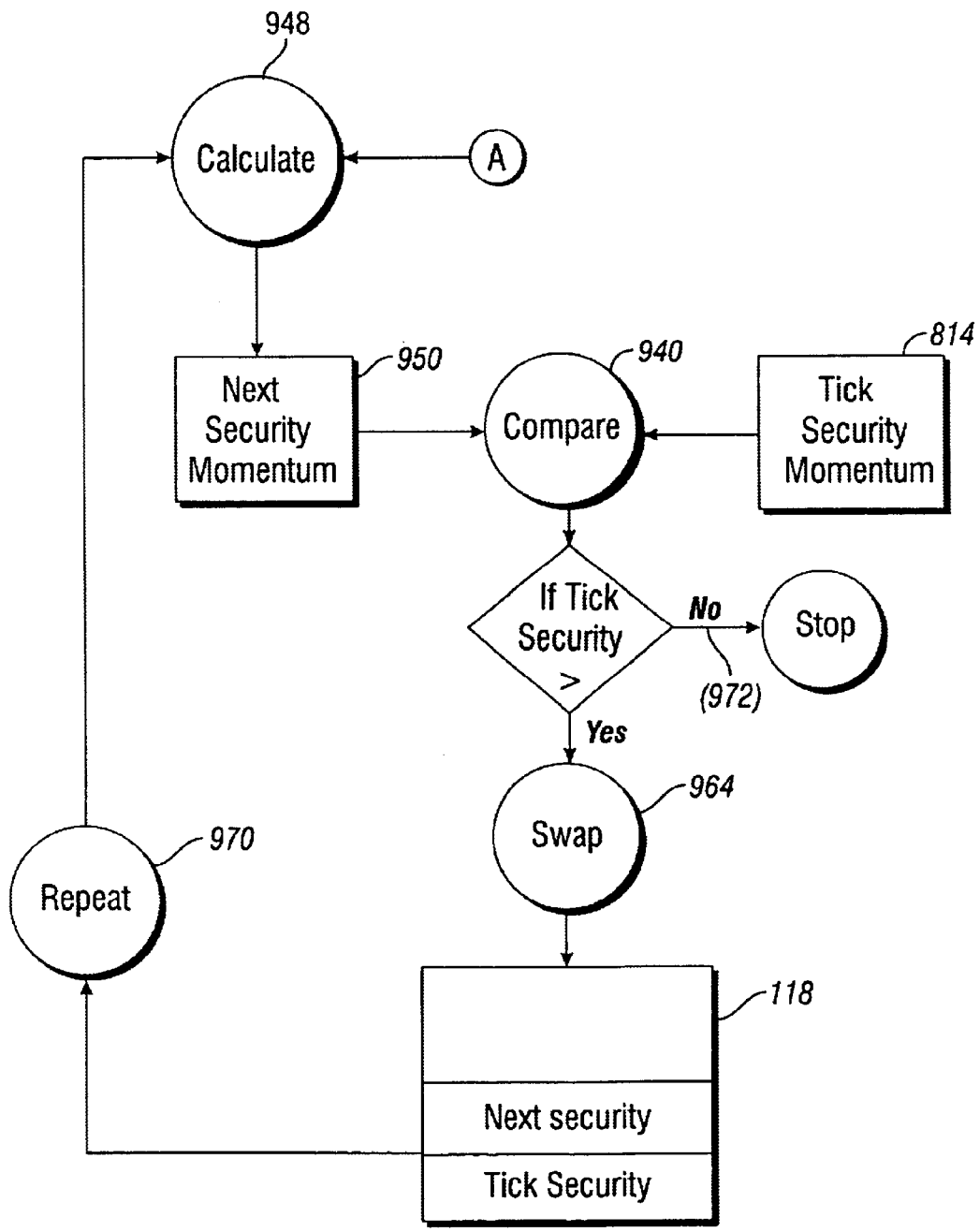

FIGS. 9D illustrates steps involved in generating the list of top moving securities.

FIG. 9E is example pseudo-code for generating the list of top moving securities.

Figure 10:
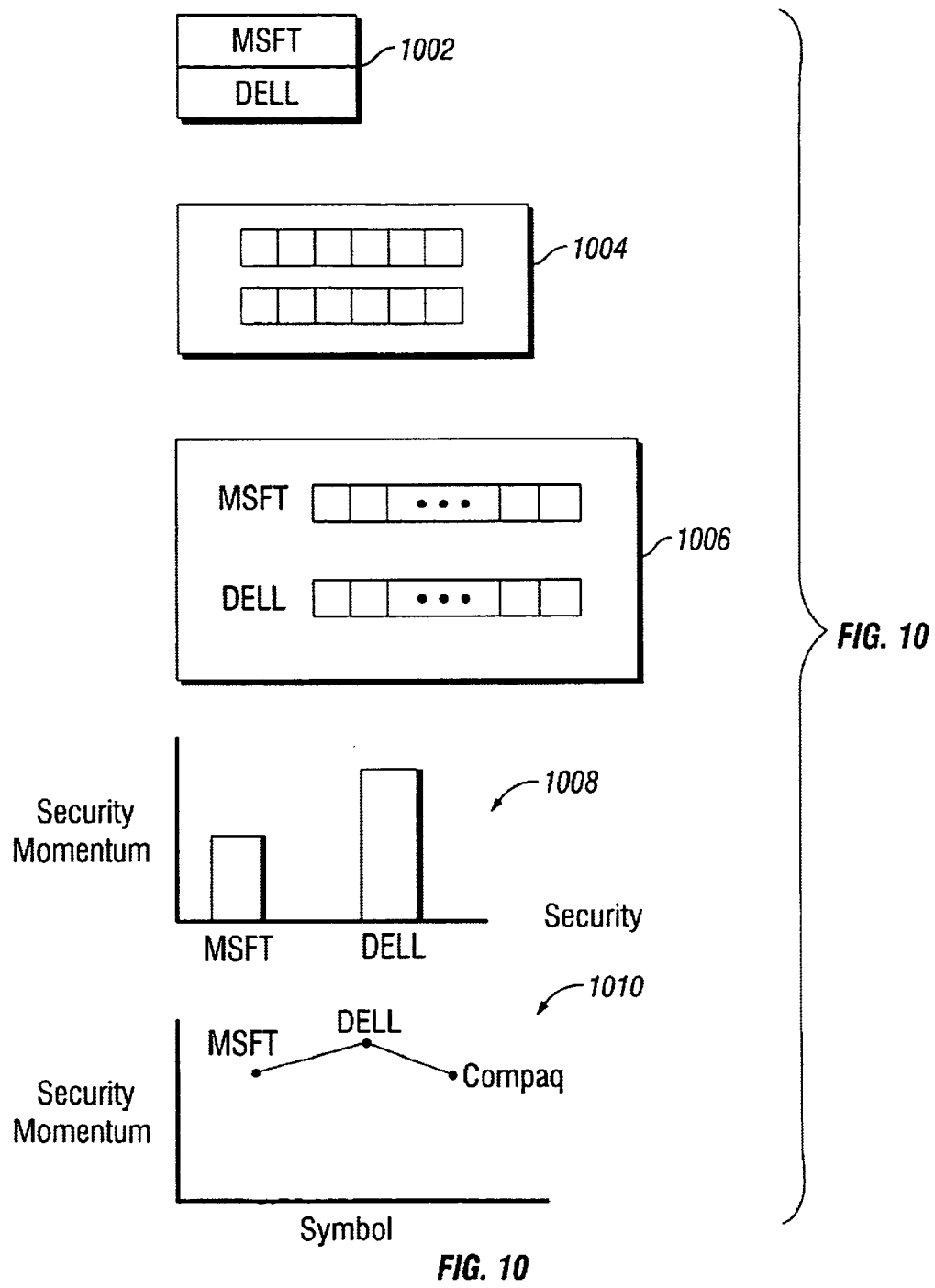

FIG. 10 illustrates example displays for the list of top moving securities.

Figure 11:
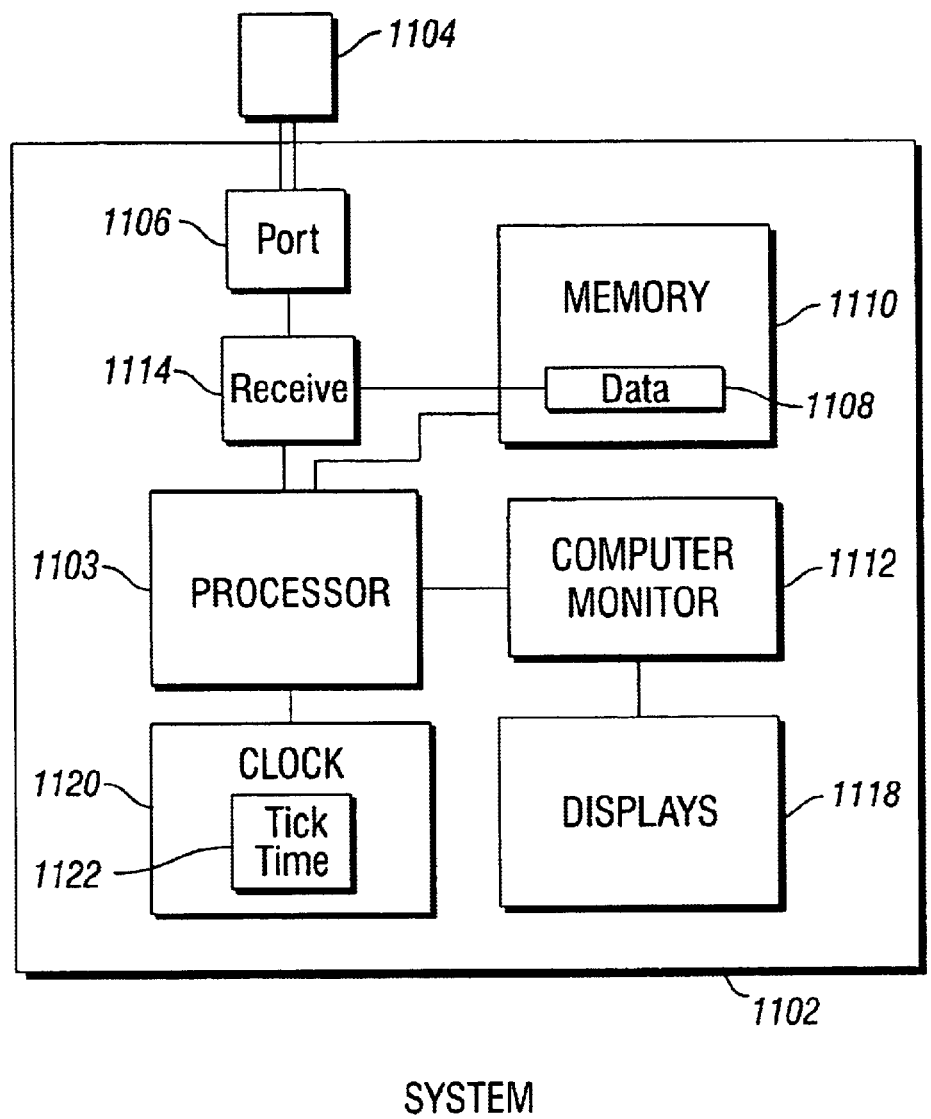

FIG. 11 is a block diagram of an embodiment of the invention.

Figures 12, 13:
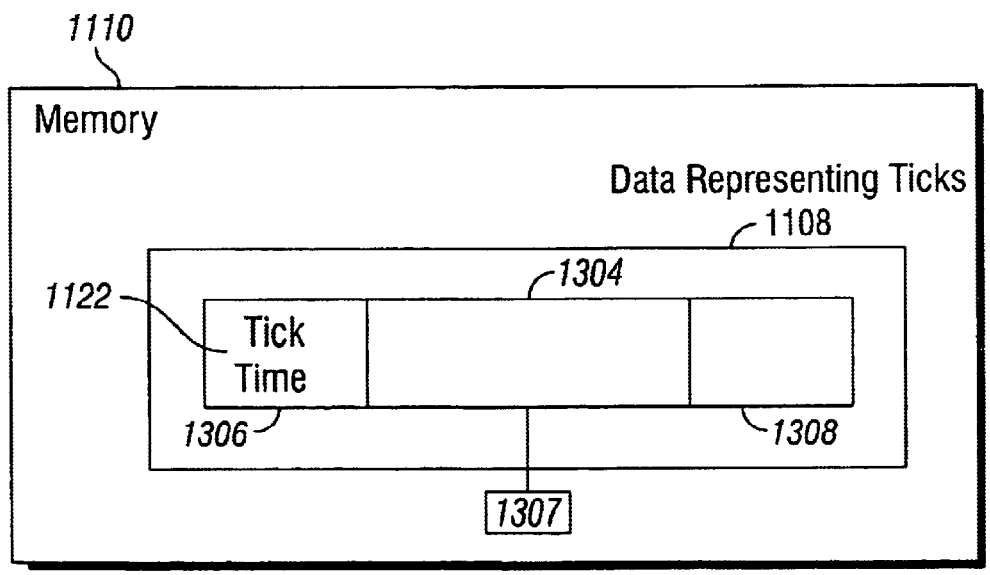

FIG. 12 is an example structure for data representing ticks.

FIG. 13 is a diagram of one embodiment of means for storing data in a time array.

Figure 13A:
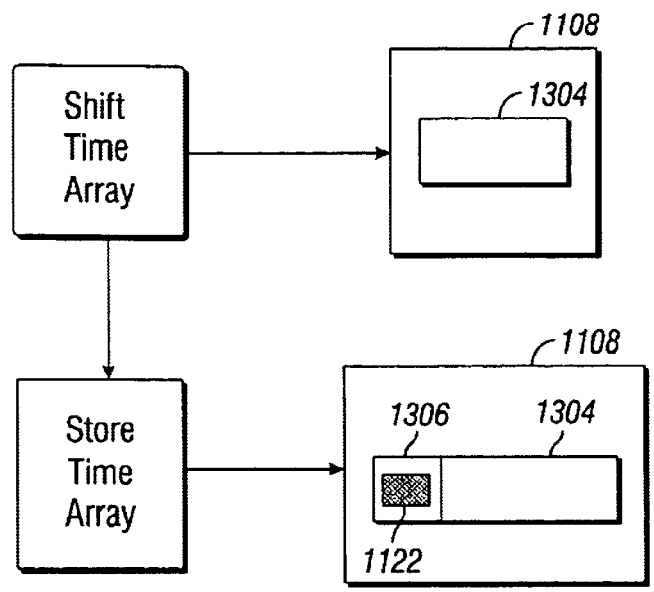

FIG. 13A is a diagram of data representing ticks in memory.

Figure 14:
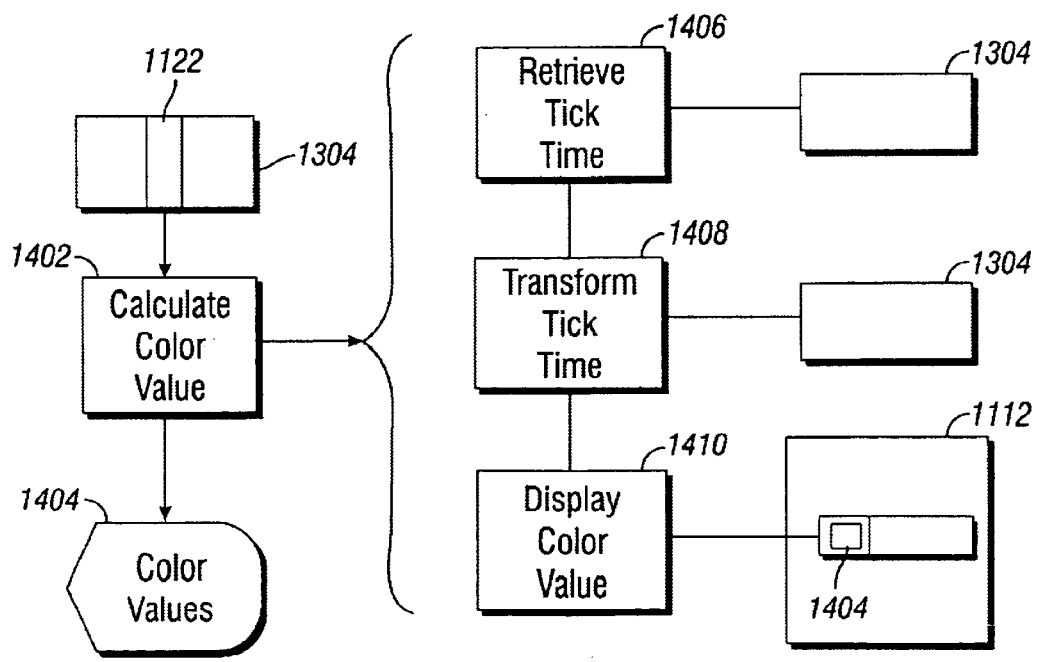

FIG. 14 is a diagram of means for calculating color values.

Figure 15:
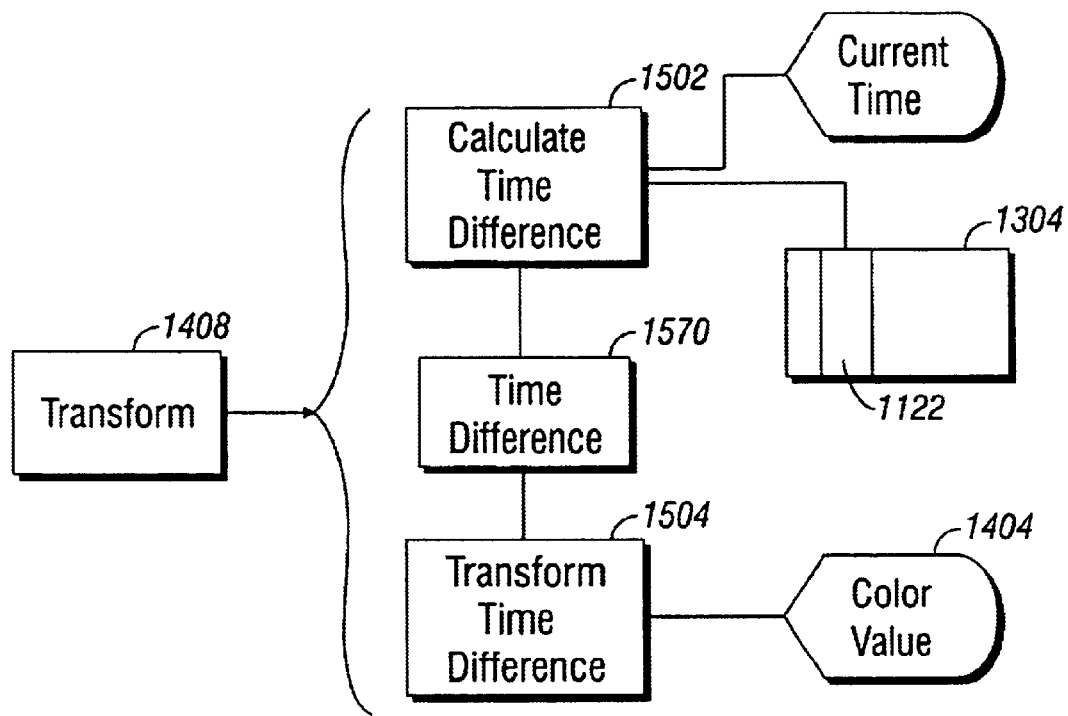

FIG. 15 is a diagram of means for transforming color values.

Figure 16:
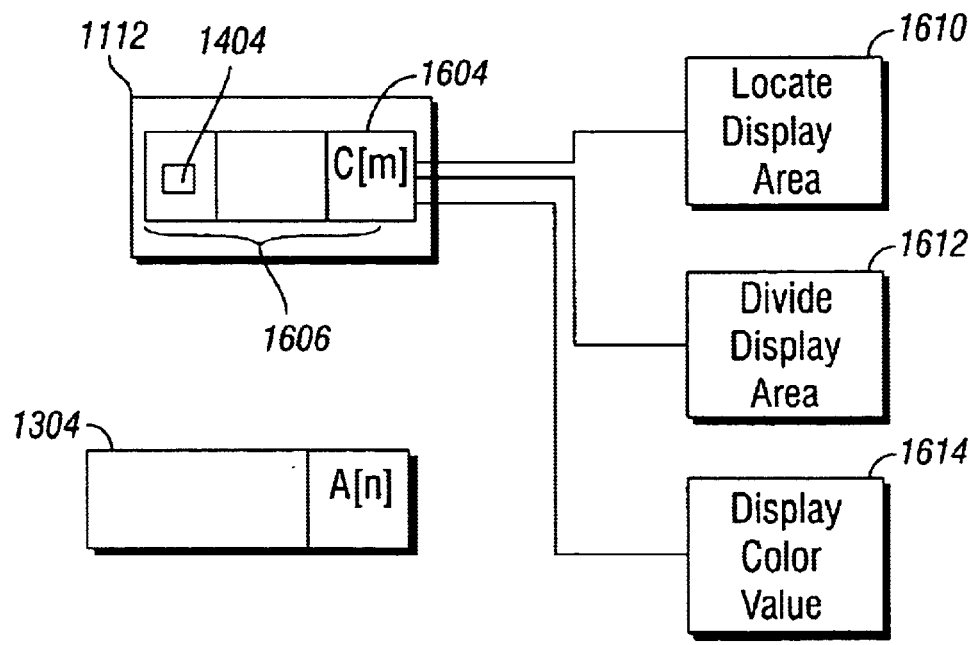

FIG. 16 is a diagram of means for displaying color values.

Figures 17, 17A:
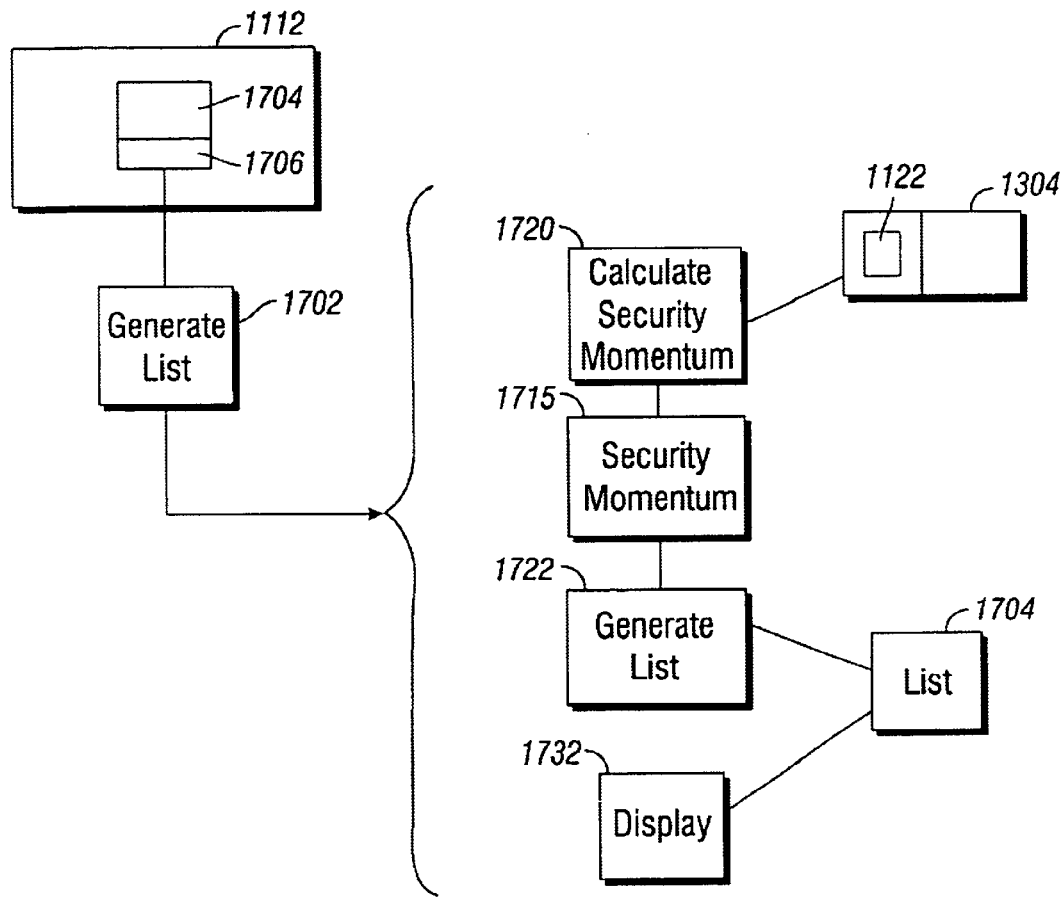

FIG. 17 is a diagram of means for generating a list of top moving securities.

FIG. 17A shows an alternative embodiment for data representing ticks.

DETAILED DESCRIPTION OF EXEMPLARY EMBODIMENTS

Definitions:

"ECN" abbreviates "Electronic Communications Network," referring to an order matching service that provides liquidity only by matching orders rather than by maintaining inventory. In the context of the invention, ECNs are considered markets. In order to avoid confusion with data communications networks, ECNs are referred to as either "ECNs" or as "markets." All ECNs have their own data communications protocols which must be followed by all systems submitting orders to ECNs. The ECNs' data communications protocols are public and well-known. Current ECNs, their symbols and names, are listed below. Obviously the number of ECNs can change at any time.

Example List of ECNs

| MMID | Name |
| --- | --- |
| ARCA | Archipelago |
| ATTN | Attain |
| BRUT | Brass Securities |
| BTRD | Bloomberg Trade Book |
| INCA | Instinet |
| ISLD | Island |
| MWSE | Midwest Stock Exchange |
| NTRD | NexTrade |
| REDI | Speer Leeds |
| STRK | Strike |
| TNTO | Terranova |

"Market," "electronic market," "market participant," "electronic market participant," "marketing network," and electronic marketing network" are all used as synonyms for services accessible through electronic communications networks capable of executing orders for securities by accepting from broker/dealers buy orders and sell orders, matching or failing to match buy orders with sell orders, and communicating the results to the broker/dealers. Generally, the term "market" is used to refer to these entities. All "markets," as the term is used, are either ECNs or market makers. All available markets have names and symbols as described under the definitions of "ECN" and "market maker."

"Market maker" means a broker/dealer providing order matching and liquidity in a stock by maintaining an inventory of the stock traded through a national market. Currently active market makers, their symbols and names, are listed below. Obviously, the number and identity of market makers can change at any time.

Example List of Market Makers

| MMID | Name |
| --- | --- |
| BEST | Bear, Stearns & Co., Inc. |
| BTAB | Alex, Brown & Sons, Inc. |
| GSCO | Goldman, Sachs & Co. |
| HMQT | Hambrecht & Quist, LLC |
| HRZG | Herzog, Heine, Geduld, Inc. |
| JANY | Janney Montgomery Scott, Inc. |
| LEHM | Lehman Brothers, Inc. |
| MADF | Bernard L. Madoff |
| MLCO | Merrill Lynch, Pierce, Fenner & Smith Inc. |
| MOKE | Morgan, Keehan & Co., Inc. |
| MONT | Nationsbanc Montgomery Securities, LLC |
| MSCO | Morgan Stanley & Co., Inc. |
| NITE | Knight Securities, L.P.. |
| OLDE | Olde Discount Corporation |
| OPCO | CIBC Oppenheimer Corporation |
| PIPR | Piper Jaffray Inc. |
| PRUS | Prudential Securities, Inc. |
| PWJC | Paine Webber, Inc. |
| RAJA | Raymond James & Associates, Inc. |
| SBSH | Smith Barney, Inc. |
| SHRP | Sharpe Capital, Inc. |
| SHWD | Sherwood Securities Corporation |

"MMID" abbreviates Market Maker ID, a code identifying a market maker. All NASDAQ traders, including ECNs, are assigned MMIDs.

"NASDAQ Level II Quotes" are provided in a stream of data directly from NASDAQ. NASDAQ Level II Quotes includes market information for markets offering to buy or sell stocks. The market information provided in a Level II Quote includes price, side, quantity, and market identification for each market offering to buy or sell a stock listed on NASDAQ.

"National market" means NASDAQ, the New York Stock Exchange, and the American Stock Exchange. SOES and SelectNet are national-level stock trading services provided through NASDAQ.

"Quotes" are aggregates of information regarding securities traded in markets. Quotes include securities listed for sale or purchase, symbols identifying the securities, price, side, quantities, and market identifications or MMIDs. Quotes can come from NASDAQ or directly from markets. A "NASDAQ Level II Quote" includes market information for all markets offering to buy or sell a particular security. Obtaining quotes directly from markets is typically faster than obtaining them from NASDAQ.

"Securities" are any agreement for investment. Stocks are the securities most often addressed in described embodiments of the invention. The invention, however, is applicable to many kinds of securities including, for example, options, commodities, and bonds.

"SelectNet" is a NASDAQ system for indirect submission to market makers and to ECNs of electronic orders for stocks listed on NASDAQ. SelectNet implements orders which are broadcasted to many markets or directed to particular selected markets. SelectNet orders for selected markets require MMIDs as parameters, the MMIDs being derived from quotes for the stock in the order. The operations of SelectNet are well-known.

"Side" refers to which side of the market is represented by an order or a quote. Side indicates whether the quote or order is to buy or sell, bid or ask. "Bid" indicates the buy side. "Ask" indicates the sell side. The present invention functions equally for either side of a transaction. Therefore, side is described generally in neutral terms.

"STL" abbreviates "standard template library," referring to the ANSI/ISO Standard Template Library. "STL" is used generally to refer to standard container templates.

"Symbol" refers to the trading symbol for a stock or other security.

A "ticks" is a changes in a quoted price for a security. Data representing ticks is received in market data, typically in the form of streaming NASDAQ quotes, electronic market information from ECNs or market makers, or other sources.

"Tick time" refers to the time when data representing a tick is received.

Detailed Description

Figure 1:
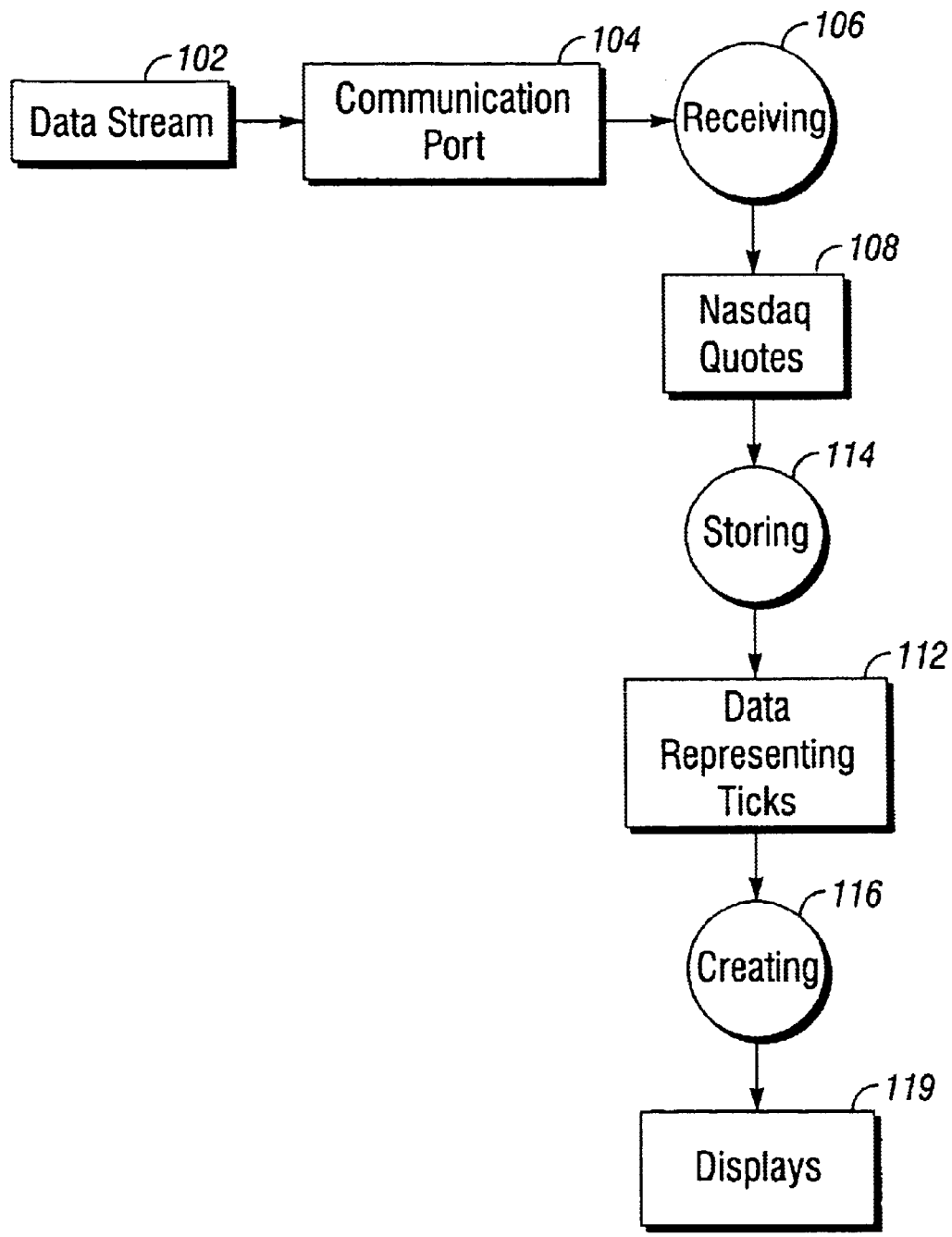
FIG. 1 is a diagram of an implementation of the invention.

In FIG. 1, there is illustrated an overview of processing steps for one embodiment of the present invention. The method of the illustrated embodiment comprises the steps of receiving (106) through a communications port (104), a data stream (102) of NASDAQ Level II quotes (108) that represent market activity, storing (114) from the NASDAQ Level II Quotes (108) data representing ticks (112), and creating (116) displays (119) based upon the data representing ticks (112). Displays 119) include thermographs and Lists of Top Movers as described below.

Figure 2:
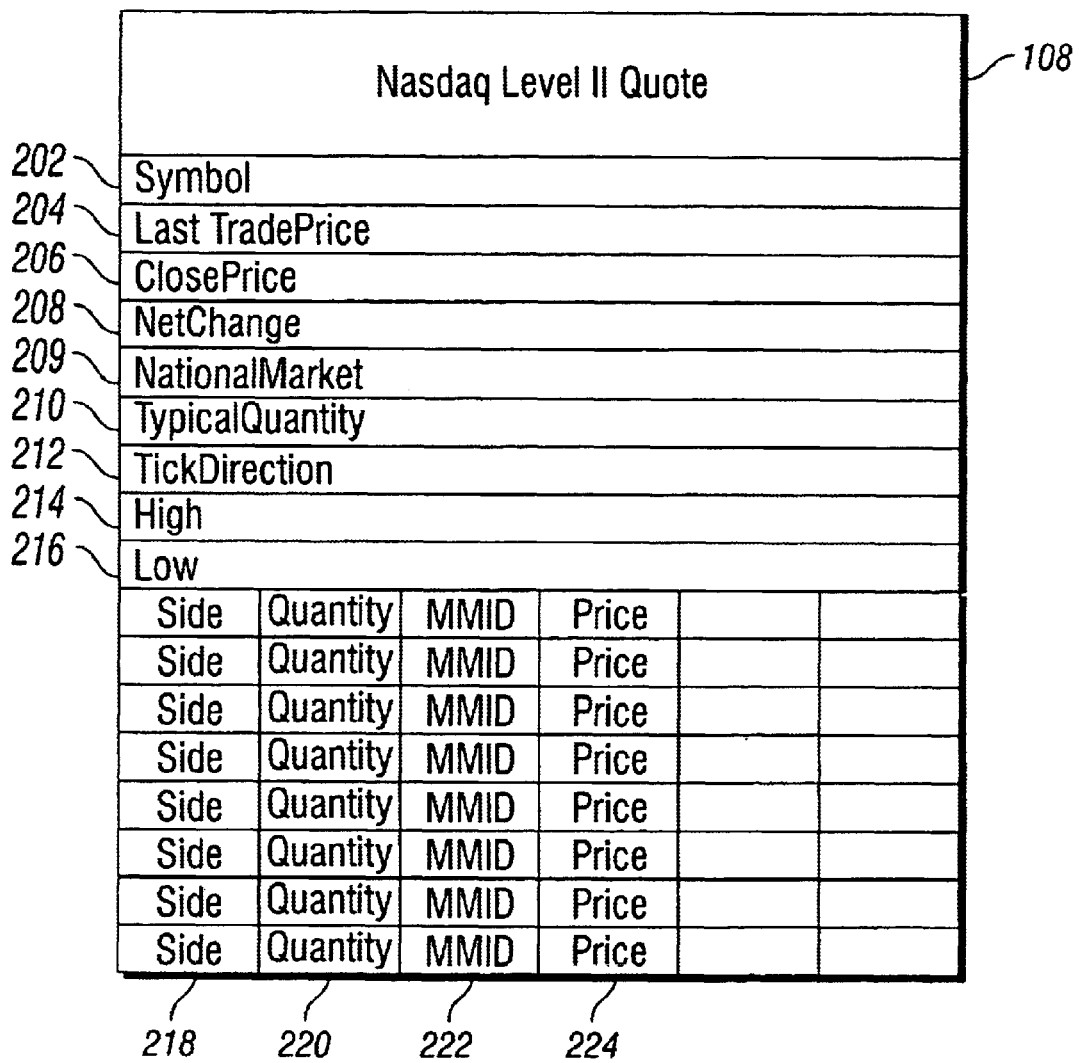
FIG. 2 illustrates the data structure of a NASDAQ Level II Quote.

In some embodiments, the data stream (102) comprises NASDAQ Level II Quotes (108). The structure of NASDAQ Level II Quotes (108) is illustrated at FIG. 2. The data elements in NASDAQ Level II Quotes (108) include the following elements which are used as indicated:

| Field | Description |
| --- | --- |
| Symbol (202) | the symbol for the stock or other security whose market information comprises the quote. |
| LastTradePrice (204) | the price of the stock in its last trade. |
| ClosePrice (206) | the price of the stock in its last trade before closing in the previous trading day. |
| NetChange (208) | the difference between LastTradePrice (1304) and ClosePrice (1306). |
| NationalMarket (209) | the national market of the stock's last trade. |
| Typical Quantity (210) | the usual quantity in which the stock trades. |
| TickDirection (212) | whether the current LastTradePrice (1304) is higher or lower than the LastTradePrice of the quote for the stock's most recent previous trade. |
| High (214) | the stock's highest price in the current session. |
| Low (216) | the stock's lowest price in the current trading session. |
| Side (218) | whether a displayed offer is a bid or ask. |
| Quantity (220) | the number of shares represented in a displayed offer. |
| MMID (222) | The market symbol for the ECNor market maker displaying an offer. |
| Price (224) | The share price in a displayed offer. |

In this embodiment of the present invention, a NASDAQ Level II Quote (108) is received every time a market maker makes a change in a quoted price for a security. Ticks are changes in quoted prices for securities. Data representing ticks (112) are derived in some embodiments from NAS-DAQ Level II Quotes (108). In other embodiments, data representing ticks (112) is derived from market information received directly from ECNs, market makers, other broker/dealers, or other sources.

The data representing ticks (112) is derived from data elements in the NASDAQ Level II Quotes (108). The data elements used to derive the data representing ticks (112) are symbols (202), tick direction (212), and side (218). Symbols (202) are securities symbols identifying the security for which the tick represents a price change. Tick direction (212) is an indication whether the price change identified by the tick was an increase or decrease in a quoted price. Ticks showing price increases are referred to as "up ticks." Ticks showing price decreases are referred to as "down ticks."

Side (218) is an indication whether the price in the tick quote is a bid price or an ask price. Bid quotes are indications of the markets' willingness to buy securities at a bid price. Ask quotes are indications of the markets' willingness to sell securities at an ask price.

The step (114) of storing data representing ticks (112), illustrated in FIG. 1, further includes determining the time a quote (108) is received from NASDAQ ("tick time"). For example, in some embodiments of the present invention, the tick time is determined by reading the system clock from the computer. After the tick time is derived, it is stored (114) in data representing ticks (112).

Figures 2A, 3:
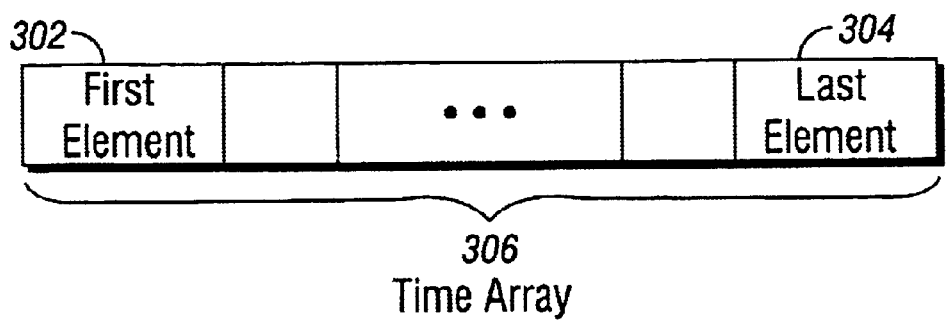
FIG. 2A shows an example data structure for data representing ticks.
FIG. 3 shows an example array structure for storing tick times.

According to the embodiment illustrated in FIG. 1, every time a NASDAQ Level II quote (108) is received (106), a tick time is stored (114) in data representing ticks (112). FIG. 2A illustrates one embodiment of the data structure used to store the data representing ticks (112). The tick time is stored in either up ticks (290) or down ticks (292) based upon the side (218) and tick direction (212) indications received in the NASDAQ quote (108). In this specific embodiment, both up ticks (290) and down ticks (292) are implemented as arrays (306) for storing tick times.

Referring to FIG. 3, there is illustrated an embodiment of a time array (306) utilized to store tick times. In some embodiments of the present invention, when a tick is received, the tick time is always initially stored in the first element (302) of the time array (306). In order to store a tick time in the first element (302) of the time array (306), the contents of the time array (306) are shifted toward the last element (304) of the time array (306), thereby emptying the first element (302) and overwriting the last element (304) of time array (306).

Figure 3A:
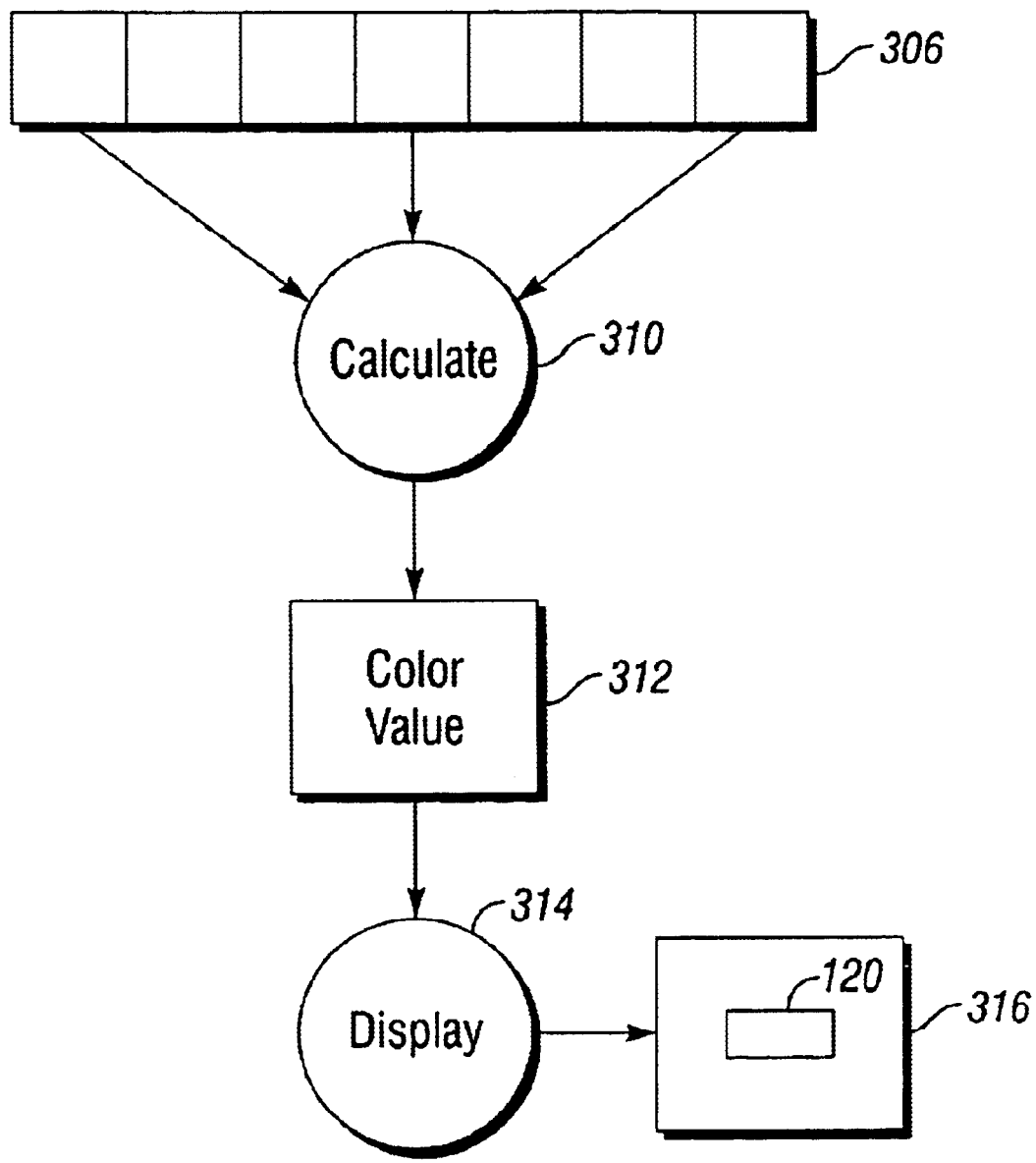
FIG. 3A is an example illustration of steps involved in calculating a color value.

In further embodiments of the invention, displays are implemented as thermographs. FIG. 3A illustrates creation of the type of display called a thermograph (120). The creation of thermograph (120) includes calculating (310) a color value (312) for each tick time (308) stored in each element of time array (306) and displaying (314) periodically each color value (312) on the computer screen (316). In some embodiments, each color value (312) is displayed once per second. Many alternative display rates are within the scope of the invention.

Figure 4:
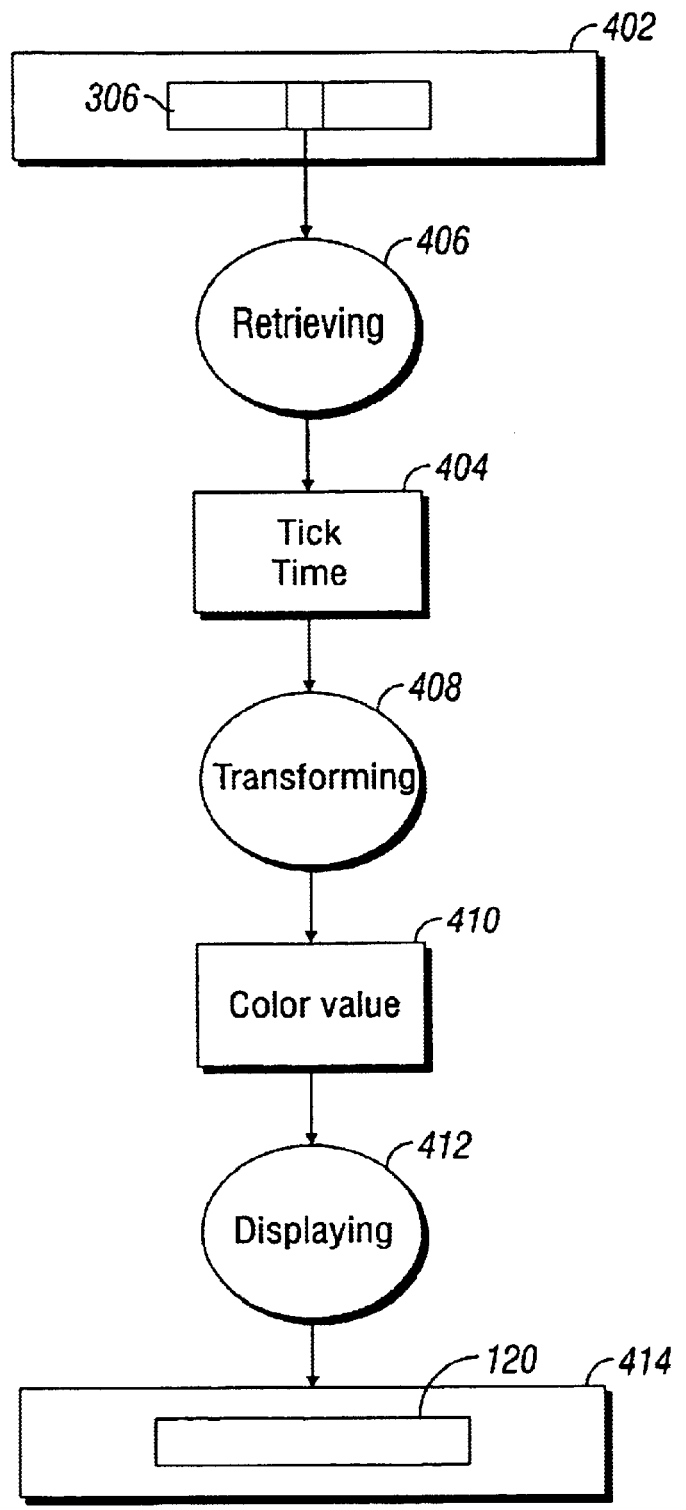
FIG. 4 is an example illustration of the steps involved in transforming a tick time into a color value.

Referring to FIG. 4, according to a more specific embodiment, the step of calculating a color value further includes the steps of retrieving (406) from the physical computer memory (402) each tick time (404) stored in the first element (302) through the last element (304) in time array (306) and transforming (408) each retrieved tick time (404) from the time array (306) into a color value (410). In one embodiment of the invention, the step of transforming (408) tick times (404) into color values (410) operates generally as illustrated in the pseudo-code shown in FIG. 5.

According to the embodiment illustrated in FIG. 6, the creation of thermograph (120) further includes locating a display area (608) on video screen (602) and dividing the display area (608) into a number of cells (604). Referring to FIG. 6A, "m" in C[m] identifies the number of cells in the display area, and "n" in A[n] identifies the number of elements in time array (306). In some embodiments, as shown in FIG. 6A, the array size (620) of time array (306) is the same as the number (622) of cells (604) in the display area (608). Many such embodiments will display in cells (604) the color values derived from the tick times stored in the corresponding elements of time array (306). For example, as shown in FIG. 6A, the color value derived from the tick time stored in time array (306) element A[3] (624) is displayed in display area (608) cell C[3](626).

In some embodiments of the present invention, as shown in FIG. 6B, a time difference (636) is calculated between the current time (630) and the tick time (404) stored in each element of time array (306). Each calculated (634) time difference (636) is transformed (408) into a color value (410) and then displayed (412) in a cell (604) located in display area (608).

Referring again to the embodiment illustrated in FIG. 6, the color values displayed in cells (604) are utilized to implement the thermograph (120). Thermograph (120) is a set of contiguous cells (604) displaying color values in display area (608) on video screen (602). Because thermograph (120) uses adjacent cells (604) to display color values corresponding to the tick times stored in time array (306), thermograph (120) visually provides a colored bar in which the range of colors displayed corresponds to the activity represented by the tick times. In this embodiment, the range of colors have a beginning color and an ending color. In the specific embodiment illustrated in FIG. 6, for example, the range of colors is from beginning color green (617) to ending color black (619).

In the specific embodiment illustrated in FIG. 6B, thermograph (120) has a beginning color, green (617) and an ending color, black (619). In this embodiment, when an up tick is received, the calculated (634) time difference (636) between the tick time (404) and the current time (630) is small. Thus, the transformed (408) color value (410) corresponding to the tick time (632) is near the beginning color, green (617). Because the time difference (636) increases over time, if no additional up ticks are received over a period of time, the color displayed for the received up tick fades to black. However, if up ticks are received frequently over a period of time, the corresponding color values (410) transformed (408) for the tick times stored (404) in the time array (306) remain near green. In this embodiment, the colored bar displayed for thermograph (120), for a steady tick stream, remains near green.

Various embodiments of thermographs are used to visually track the market activity of securities. In describing such embodiments, the phrase "green thermograph" refers to a thermograph having beginning color green and ending color black, and "red thermograph" refers to a thermograph having beginning color red and ending color black.

For example, referring to FIG. 7A, embodiments of green thermographs (710, 714) are seen displayed on the bid and ask side of the quote and embodiments of red thermographs (708, 712) are seen displayed on the bid and ask side of the quote. In the embodiment illustrated in FIG. 7A, the color green represent up ticks and the color red represent down ticks. In this specific embodiment, the illustrated thermographs track up ticks and down ticks for the bid and the ask side of the quote for the security identified by the symbol MSFT (702).

Referring to FIG. 7B, an embodiment of a green thermograph (710) is seen displayed on the bid side (704) of the quote and an embodiment of a green thermograph (714) is seen displayed on the ask side of the quote. In this specific embodiment, the illustrated thermographs track up ticks for the bid side (704) and the ask side (706) of the quote for the security identified by the symbol MSFT (702).

Referring to FIG. 7C, an embodiment of a red thermograph (708) is seen displayed on the bid side (704) of the quote and an embodiment of a red thermograph (712) is seen displayed on the ask side of the quote. In this specific embodiment, the illustrated thermographs track down ticks for the bid side (704) and the ask side (706) of the quote for the security identified by the symbol MSFT (702).

Referring to FIG. 7D, an embodiment of a green thermograph (710) is seen displayed on the bid side (704) of the quote. In this specific embodiment, the illustrated thermograph tracks the up ticks for the bid side (704) of the quote for the security identified by the symbol MSFT (702).

Referring to FIG. 7E, an embodiment of a red thermograph (708) is seen displayed on the bid side (704) of the quote. In this specific embodiment, the illustrated thermograph tracks the down ticks for the bid side (704) of the quote for the security identified by the symbol MSFT (702).

Referring to FIG. 7F, an embodiment of a green thermograph (714) is seen displayed on the ask side (706) of the quote. In this specific embodiment, the illustrated thermograph tracks up ticks for the ask side (706) of the quote for the security identified by the symbol MSFT (702).

Referring to FIG. 7G, an embodiment of a red thermograph (712) is seen displayed on the ask side (706) of the quote. In this specific embodiment, the illustrated thermograph tracks down ticks for the ask side (706) of the quote for the security identified by the symbol MSFT (702).

In another aspect of the present invention as shown in FIG. 8, a list (118) of top moving securities is generated (816) from stored tick times (806). As described above, NASDAQ Level II quotes (108) are received (106), the tick times for the received quotes (108) are derived and then, the tick times are stored (114) in an embodiment of data representing ticks (802). One embodiment of the data representing ticks (802) is shown in FIG. 9B. In the embodiment of FIG. 9B, in the structure labeled "Movement" (803), tick times (806) are stored for the security represented by the symbol (804).

As shown in FIG. 8, the generation (816) of the list (118) of top moving securities is based upon the security momentum (814) of each security in the list. The security momentum (814), which is a numeric indication of relative security price motion, is calculated (810) from the stored tick times (806) in the data representing ticks (802). In some embodiments as illustrated in FIG. 9A, the security momentum (814) is calculated by first calculating (934) the time difference (936) between the current time (930) and each tick time (806) stored in the time array (306) and then, summing (938) the calculated time differences (936). In the illustrated embodiment, the step of calculating the security momentum generally functions as illustrated in the pseudo-code shown in FIG. 9B.

A further embodiment is shown in FIGS. 9C and FIG. 9D. Referring first to FIG. 9C, a NASDAQ Level II Quote (108) is received (106) and a security momentum (814) is calculated (810) for the security identified in the quote (108) ("tick security") (812). A security momentum (956) is calculated (954) for the bottom listed security (940). The security momentum (814) of the tick security (812) is compared (940) with the security momentum (814) of the bottom listed security (952). If the security momentum (814) of tick security (812) is greater than the security momentum (814) of the bottom listed security (952), the bottom listed security (952) is replaced (944) with the tick security (812).

Referring still to FIG. 9D, if the tick security (812) is placed on the bottom of the list (118), a security momentum (950) for the security (946) just above the tick security on the list is calculated (948). The security momentum (950) of the security (946) just above the tick security and the security momentum (814) of the tick security (812) is compared (960). If the comparison (960) shows that the security momentum (814) of the tick security (812) is greater than the security momentum (950) of the security (946) just above the tick security on the list, the positions of the tick security (812) and the security (946) just above the tick security on the list are swapped (964). The steps of calculating (948) the security momentum (950) for the security (946) just above the tick security on the list, comparing (960) the security momentum (950) of the security (946) just above the tick security and the security momentum (814) of the tick security (812), and swapping (964) the positions of the tick security (812) and the security (946) just above the tick security on the list are repeated (970) until the security momentum (814) of the tick security (812) is not greater than (972) the security momentum (950) of the security (946)just above the tick security on the list. The pseudo-code illustrated in FIG. 9E shows in more detail the steps for generating the list of securities (118) with the highest security momenta.

Examples of alternative structures for the list of securities (118), all within the scope of the invention, include: arrays of pointers to data representing ticks class objects, STL string containers, array of pointers to character strings, linked lists of structures further comprising pointers to character strings, linked lists of structures further comprising STL string containers, and linked lists of structures further comprising pointers to character strings.

Referring to FIG. 10, alternative embodiments for displaying the list (118) of securities are illustrated as: text illustrating symbols that identify each security on the list (1002), thermographs for each security on the list (1004), text symbols with thermographs located adjacent to the text symbols (1006), a bar chart (1008), and a point graph (1010).

Referring now to FIG. 11, according to a further aspect of the invention, a system for representing market activity is seen implemented in software operating on a digital computer (1102). In some embodiments of the present invention, for example, digital computer (1102) is a personal computer, a workstation, a lap top, or any such type of processing system. In other embodiments, digital computer (1102) is automated computing machinery comprising programmable logic arrays. In other embodiments, digital computer (1102) is automated computing machinery comprising hard-wired logic. In other embodiments, digital computer (1102) is automated computing machinery comprising software programs stored in random access memory. In other embodiments, digital computer (1102) is automated computing machinery comprising software programs stored in read only memory. In other embodiments, digital computer (1102) is automated computing machinery comprising software programs stored in programmable read only memory.

The market activity in the system of FIG. 11 is represented by data in a data stream (1104), received through a communications port (1106), the system comprising a means (1110) for storing data (1108) representing a tick and a means (1112) for creating displays (1118) dependent upon the data representing a tick. The displays (1118) include thermographs and lists of top movers. FIG. 7A through 7G illustrates specific embodiments of thermographs, and FIG. 10 illustrates specific embodiments of the lists of top movers, the alternative display forms including text illustrating symbols that identify each security on the list (1002), thermographs for each security on the list (1004), text symbols with thermographs located adjacent to the text symbols (1006), a bar chart (1008), and a point graph (1010).

In some embodiments of the present invention, for example, the connection to the communication port (1106) is a modem connection over a telephone line. In other embodiments, the communication port connection is via local area network, wide area network, dedicated line, satellite or some other type of connection. In the illustrated embodiment, communication port (1106) provides the means for data transmission to the system of FIG. 11.

In some embodiments of the present invention, for example, the means for creating (1112) a display is a computer monitor. In other embodiments, means for creating display is a video screen or a computer screen.

According to another embodiment of the invention, the system of FIG. 11 further comprises means (1114) for receiving the data stream (1104). In some embodiments, the data stream (1104) comprises NASDAQ Level II Quotes. According to an even more specific embodiment, ticks are represented by data (1108) in the NASDAQ Level II Quotes. In this embodiment, a tick is a change in a quoted price for a security. In such embodiments, means for receiving the data stream is typically a direct subscriber data link to NASDAQ.

According to a more specific embodiment of the invention, the system seen in FIG. 11, further comprises means (1120) for determining the time the tick is received from NASDAQ ("tick time"). In some embodiments, a system clock (1120) on a computer or automated computing machinery is the means for determining the tick time (1122).

Referring now to FIG. 12, a specific embodiment is seen in which data (1108) representing ticks comprises a security symbol (1202). According to a more specific embodiment, the data representing ticks further comprises a tick direction (1206) and a side (1208).

According to an even more specific embodiment, the side (1208) of a quote is either a bid (1210) or an ask (1212). A bid (1210) quote is an indication of a market's willingness to buy securities at a price and an ask (1212) quote is an indication of a market's willingness to sell securities at a price. According to an even more specific embodiment, the tick direction (1206) is either up or down. The up tick (1208) indicates an increase in a quoted price and the down tick (1210) indicates a decrease in a quoted price.

Now referring to FIG. 13, a specific embodiment is seen in which said means (1110) for storing data (1108) representing a tick further comprises a means (1307) for storing the time the data (1108) representing the tick was received ("tick time") (1122) in a time array (1306) having a number of physical computer memory locations including a first memory location (1306) and a last memory location (1308). In this embodiment, said means (1110) for storing is computer memory, for example, random access memory or read only memory.

Referring to FIG. 13A, according to a more specific embodiment, storing data (1108) representing a tick further comprises a means (1320) for shifting the contents of the time array (1304) toward the last memory location (1308), thereby emptying the first memory location (1306) and overwriting the last memory location (1308) and a means (1322) for storing the tick time (1122) in the first memory location (1305). Means for shifting in such embodiments typically comprises a CPU operating under program control to shift the contents of elements of a memory array. Means for storing the tick time in memory typically comprises identified memory storage locations implemented as arrays, linked lists, STL containers, and the like.

Referring to FIG. 14, according to a more specific embodiment of the invention, said means for creating (1110) a display further comprises means for calculating (1402) a color value (1404) for each tick time (1122) stored in the time array (1304), the color values (1404) being dependent upon the corresponding tick times (1122). According to an even more specific embodiment, said means for calculating (1402) a color value (1404) further comprises means for retrieving (1406) from computer memory the tick time (1122) stored in each memory location of the time array (1304), means (1408) for transforming each tick time (1122) in the time array (1304) into a color value (1404) and means (1410) for displaying each color value (1404) onto a computer screen (1110). According to an even more specific embodiment, said means (1410) for creating a display periodically displays the colors corresponding to the color values (1404).

Means for calculating (1402) a color value (1404) for each tick time (1122) stored in the time array (1304), the color values (1404) being dependent upon the corresponding tick times (1122), comprises, in some embodiments, CPUs operating under software program control, the software programs being resident in random access memory or read only memory. Means for calculating (1402) a color value (1404), means for retrieving (1406) from computer memory the tick time (1122) stored in each memory location of the time array (1304), means (1408) for transforming each tick time (1122) in the time array (1304) into a color value (1404), and means (1410) for displaying each color value (1404) onto a computer screen (1110), also each typically comprise, in most embodiments, CPUs operating under software program control, the software programs being resident in random access memory or read only memory. Similarly, means (1410) for creating a display for colors corresponding to color values (1404) also typically comprises, in many embodiments, CPUs operating under software program control, the software programs being resident in random access memory or read only memory. In other embodiments, the CPUs operating under program control are replaced with programmable logic arrays or dedicated logic implemented in integrated circuits.

Referring to FIG. 15, according to a more specific embodiment, said means (1408) for transforming each tick time (1122) in the time array (1304) further comprises a means (1502) for calculating a time difference (1510) between a current time (1506) and the tick time (1122) stored in each memory location of the time array (1304) and a means (1504) for transforming the time difference (1510) into a color value (1404). According to an even more specific embodiment, said means (1504) for transforming the time differences (1510) into color values (1404) operates according to the following formula:

color value=((Y2−Y1)/(X2−X1))*(x−X1)+Y1, wherein color value is the color value for display, x is a time difference between the current time and the tick time stored in a memory location of the time array, the time difference lying within a range of time differences, the range of time differences having a first value in the range of time differences and a last value in the range of time differences, X1 is the first value in the range of time differences, X2 is the last value in the range of time differences, Y1 is the first value in a range of colors, the range of colors having a first value in the range of colors and a last value in the range of colors, and Y2 is the last value in the range of colors.

Referring to FIG. 15, means (1408) for transforming each tick time (1122) in the time array (1304), means (1502) for calculating a time difference (1510) between a current time (1506) and the tick time (1122) stored in each memory location of the time array (1304), and means (1504) for transforming the time difference (1510) into a color value (1404), each typically comprise, in many embodiments, CPUs operating under software program control, the software programs being resident in random access memory or read only memory. In other embodiments, the CPUs operating under program control are replaced with programmable logic arrays or dedicated logic implemented in integrated circuits.

Referring now to FIG. 16, a specific embodiment is seen in which a display area (1604) is divided into a number of cells (1606) dependent upon the number of memory locations in the time array (1304). In the illustrated embodiment, "n" is the size of time array (1304) and "m" is the number of cells in display area (1604). The number of cells "m" in display area (1604) corresponds to "n" the size of time array (1304).

Referring still to FIG. 16, according to a more specific embodiment, said means (1112) for creating a display further comprises a means (1610) for locating a display area (1604) on a video screen (1112), a means (1612) for dividing the display area (1604) into at least one cell (1606), and a means (1614) for displaying in the cells (1606) on the video screen (1112) colors corresponding to the color values (1404).

Referring now to FIG. 17, another embodiment of system of the present invention is illustrated. In this embodiment of the system, the means (1112) for creating a display further comprises means (1702) for generating a list (1704) of top moving securities dependent upon the data (1704) representing a tick. The list (1704) of top moving securities further comprises at least one listed security and a bottom listed security (1706).

Referring to FIG. 17A, a specific embodiment for data (1704) representing ticks is shown. The data elements in this specific embodiment include a symbol (1740) for identifying the security for which a tick is received and a time array (1306) for storing tick times for the security identified by symbol (1740).

According to a more specific embodiment of the system shown in FIG. 17, the means (1702) for generating a list of securities further comprises a means for calculating (1720) from the stored tick times (1122) a security momentum (1715) for the security identified by the symbol in the data (1704) representing the tick ("the tick security"). Security momentum (1715) is a numeric indication of relative security price motion. Means (1702) for generating a list of securities and means for calculating (1720) a security momentum comprise, in the illustrated embodiment, one or more CPUs operating under software program control, the software programs being resident in random access memory or read only memory. In other embodiments, the CPUs operating under program control are replaced with programmable logic arrays or dedicated logic implemented in integrated circuits. The means for calculating the security momentum, in the illustrated embodiment, is programmed to operate generally in accordance with the pseudo-code shown in FIG. 9B.

According to an even more specific embodiment, the system in FIG. 17 further includes a means (1734) for generating a list (1730) of securities having the highest security momenta and a means (1732) for displaying on a computer screen (1112) the list (1704) of securities with the highest security momenta. The means (1734) for generating a list (1730) of securities having the highest security momenta and the means (1732) for displaying on a computer screen (1112) the list (1704) of securities with the highest security momenta comprise, in the illustrated embodiment, one or more CPUs operating under software program control, the software programs being resident in random access memory or read only memory. In other embodiments, the CPUs operating under program control are replaced with programmable logic arrays or dedicated logic implemented in integrated circuits. The means (1734) for generating a list of securities with the highest security momenta, in the illustrated embodiment, is programmed to operate generally in accordance with the pseudo-code illustrated in FIG. 9E. Illustrated in FIG. 10 are alternative embodiments for the displays of the list (1704) of securities with the highest security momenta, the alternatives including text illustrating symbols that identify each security on the list (1002), thermographs for each security on the list (1004), text symbols with thermographs located adjacent to the text symbols (1006), a bar chart (1008), and a point graph (1010).

What is claimed is:

1. A display depicting market activity, the display comprising:
   a display area disposed on a computer screen;
   displayed in the display area, information indicative of market activity, the information being dependent upon market data and tick times, wherein the information indicative of market activity comprises colors dependent upon color values; and
   automated computing machinery that computes the color values according to the formula:

color value=$((Y2-Y1)/(X2-X1))*(x-X1)+Y1$, wherein color value is the color for display,
   x is a time difference between a current time and the tick time, the time difference lying within a range of time differences, the range of time differences having a first value in the range of time differences and a last value in the range of time differences,
   X1 is the first value in the range of time differences,
   X2 is the last value in the range of time differences,
   Y1 is a first value in a range of colors, the range of colors having first value in the range of colors and a last value in the range of colors, and
   Y2 is the last value in the range of colors.

2. The display of claim 1 wherein the market data is dependent upon market activity, the market data being received in a computer as a data stream through a communications port.

3. The display of claim 1 wherein the market data comprises NASDAQ Level II Quotes.

4. The display of claim 1 wherein the market data comprises data representing ticks, the data representing ticks further comprising tick times.

5. The display of claim 4 wherein data representing ticks further comprises a symbol.

6. The display of claim 4 wherein data representing ticks further comprises a tick direction.

7. The display of claim 4 wherein data representing ticks further comprises a side.

8. The display of claim 4 wherein the data representing ticks is stored in memory storage locations in computer memory.

9. The display of claim 1 wherein the display area is divided into at least one display cell.

10. The display of claim 9 wherein the information indicative of market activity comprises color values dependent upon market data and upon tick times, the color values displayed as colors in the display area.

11. The display of claim 10 wherein, for each tick time stored in computer memory, one color value is calculated and displayed in one cell in the display area on the computer screen, each color value being displayed as a color in a separate cell.

12. The display of claim 9 wherein, for each tick time stored in computer memory for a symbol, one color value is calculated and displayed in one cell in the display area on the computer screen, each color value being displayed as a color in a separate cell.

13. The display of claim 9 wherein, for each tick time stored in computer memory for a symbol and a tick direction, one color value is calculated and displayed in one cell in the display area on the computer screen, each color value being displayed as a color in a separate cell.

14. A display depicting market activity, the display comprising:
   a display area disposed on a computer screen;
      displayed in the display area, information indicative of market activity, the information being dependent upon market data and tick times, wherein the information indicative of market activity comprises a list of top moving securities comprising a predetermined number of securities, which list further comprises a security occupying a bottom position in the list ("the bottom listed security"); and
   automated computing machinery programmed to compute:
      for a security identified by a symbol in data representing a tick ("the tick security"), a security momentum, said security momentum being a numeric indication of relative security price motion;
      a security momentum for the bottom listed security;
      a comparison of the security momentum of the tick security and the security momentum of the bottom listed security;
      replacement of the bottom listed security, with the tick security if the security momentum of the tick security is greater than the security momentum of the bottom listed security, thereby including the tick security in the list;
      if the tick security is included in the list, a comparison of the security momentum of the tick security and the security momentum of a security just above the tick security in the list; and
      an exchange of the positions of the tick security and the security just above the tick security in the list if the security momentum of the tick security is greater than the security momentum of the security just above the tick security in the list.

15. The display of claim 14 wherein, when computing a security momentum, the automated computing machinery also computes:
   a time difference between a current time and stored tick times; and
   a sum of the time differences so computed.

16. A method of representing market activity, wherein market data dependent upon market activity is received in a data stream through a communications port, the method comprising the steps of:

receiving a tick, said receiving further comprising extracting from said data stream and from a clock data representing a tick, wherein data representing a tick comprises a symbol and the time when the data representing a tick is received ("tick time"); and creating a display dependent upon the data representing a tick, wherein creating a display further comprises the steps of:

calculating a difference between the tick time and a current time;

calculating a color value according to the formula:

color value=$((Y2-Y1)/(X2-X1))*(x-X1)+Y1$, wherein color value is the color value for display, x is the time difference between the current time and the tick time, the time difference lying within a range of time differences, the range of time differences having a first value in the range of time differences and a last value in the range of time differences, X1 is the first value in the range of time differences, X2 is the last value in the range of time differences, Y1 is a first value in a range of colors, the range of colors having a first value in the range of colors and a last value in the range of colors, and Y2 is the last value in the range of colors; and displaying the color value as a color on a computer screen.

17. The method of claim 16 further comprising storing the data representing a tick.

18. The method of claim 17 wherein the market data comprises NASDAQ Level II Quotes.

19. The method of claim 18 wherein ticks are represented by market data in the NASDAQ Level II Quotes.

20. The method of claim 16 wherein a tick is a change in a quoted price for a security.

21. The method of claim 16 wherein the data representing ticks comprises a security symbol.

22. The method of claim 21 wherein the data representing ticks further comprises a tick time.

23. The method of claim 22 wherein the data representing ticks further comprises a tick direction.

24. The method of claim 22 wherein the data representing ticks further comprises a side.

25. The method of claim 19, wherein storing data representing a tick further comprises determining the time the tick is received from NASDAQ ("tick time").

26. The method of claim 18, wherein data representing a tick is received, storing data representing a tick further comprising storing the time the data representing the tick was received ("tick time") in a time array having a number of ordered elements including a first element and a last element.

27. The method of claim 26 further comprising:

shifting the contents of the time array toward the last element, thereby emptying the first element and overwriting the last element; and storing the tick time in the first element.

28. The method of claim 26, wherein creating a display further comprises calculating a color value for each tick time stored in the time array, the color values being dependent upon the corresponding tick times.

29. The method of claim 28 further comprising periodically displaying colors corresponding to the color values.

30. The method of claim 18, wherein the step of creating a display further comprises:

retrieving from computer memory the tick time stored in each element of the time array;

transforming each tick time in the time array into a color value; and displaying each color value as a color on a computer screen.

31. The method of claim 30, wherein creating a display further comprises the steps of:

locating a display area on a video screen;

dividing the display area into at least one cell;

displaying in the cells on the video screen colors corresponding to the color values.

32. The method of claim 31, wherein the step of displaying colors in the cells on the video screen further comprises refreshing the display periodically.

33. The method of claim 31, wherein the step of dividing the display area into cells further comprises dividing the display area into a number of cells dependent upon the number of ordered elements in the time array.

34. The method of claim 30, wherein the step of transforming each tick time in the time array further comprises:

calculating a time difference between a current time and the tick time stored in each element of the time array; and transforming the time difference into a color value.

35. The method of claim 34, wherein the step of transforming the time differences into color values further comprises calculating a color value according to the formula:

color value=$((Y2-Y1)/(X2-X1))*(x-X1)+Y1$, wherein color value is the color value for display, x is a time difference between the current time and the tick time stored in an element of the time array, the time difference lying within a range of time differences, the range of time differences having a first value in the range of time differences and a last value in the range of time differences, X1 is the first value in the range of time differences, X2 is the last value in the range of time differences, Y1 is the first value in a range of colors, the range of colors having a first value in the range of colors, and Y2 is the last value in the range of colors.

36. A method of representing market activity, wherein market data dependent upon market activity is received in a data stream through a communications port, the method comprising the steps of:

receiving a tick, said receiving further comprising extracting from said data stream and from a clock data representing a tick, wherein data representing a tick comprises a symbol and the time when the data representing a tick is received ("tick time"), said receiving further comprising storing in computer memory the data representing a tick including storing the tick times; and creating a display dependent upon the data representing a tick, wherein creating a display comprises generating a list of top moving securities dependent upon the data representing a tick, the list comprising securities having the highest security momenta, the list comprising at least one security and a bottom listed security, the generating of the list further comprising the steps of:

calculating from the stored tick times a security momentum for the security identified by the symbol in the data representing the tick ("the tick security"), said security momentum being a numeric indication of relative security price motion;

calculating a security momentum of the bottom listed security;

comparing the security momentum of the tick security with the security momentum of the bottom listed security;

if the comparison shows that the security momentum of the tick security is greater than the security momentum of the bottom listed security, the method further comprising replacing the bottom listed security with the tick security;

calculating the security momentum for the security just above the tick security on the list;

comparing the security momentum of the security just above the tick security and the security momentum of the tick security;

if the comparison shows that the security momentum of the tick security is greater than the security momentum of the security just above the tick security on the list, swapping the positions of the tick security and the security just above the tick security on the list.

37. The method of claim 36, wherein the step of calculating from the stored tick times a security momentum further comprises:

calculating time differences between a current time and stored tick times; and summing the calculated time differences.

38. The method of claim 36, further comprising displaying on a computer screen the list of securities with the highest security momenta, each security in the list having a display location on the computer screen.

39. The method of claim 38 further comprising the steps of:

transforming each stored tick time into a color value wherein transforming further comprises calculating the color values according to the formula:

color value=$((Y2-Y1)/(X2-X1))*(x-X1)+Y1$, wherein color value is the color value for display, x is a time difference between a current time and the tick time, the time difference lying within a range of time differences, the range of time differences having a first value in the range of time differences and a last value in the range of time differences, X1 is the first value in the range of time differences, X2 is the last value in the range of time differences, Y1 is a first value in a range of colors, the range of colors having the first value in the range of colors and a last value in the range of colors, and Y2 is the last value in the range of colors; and displaying each color value as a color on the computer screen at a color display location dependent upon the display location of each security in the list.

40. The method of claim 39, wherein displaying each color value further comprises:

locating a color display area on a video screen dependent upon the display locations of the securities in the list;

dividing the color display area into at least one cell; and displaying in the cells on the video screen colors corresponding to the color values.

41. The method of claim 38 further comprising displaying in the form of text the list of securities with the highest security momenta, the text showing the symbols of the securities with the highest security momenta, each symbol having a display location on the computer screen.

42. The method of claim 41 further comprising the steps of:

transforming each stored tick time into a color value, wherein the transforming further comprises calculating a color value according to the formula:

color value=$((Y2-Y1)/(X2-X1))*(x-X1)+Y1$, wherein color value is the color value for display, x is a time difference between the current time and the tick time stored in an element of the time array, the time difference lying within a range of time differences, the range of time differences having a first value in the range of time differences and a last value in the range of time differences, X1 is the first value in the range of time differences, X2 is the last value in the range of time differences, Y1 is the first value in a range of colors, the range of colors having a first value in the range of colors and a last value in the range of colors, and Y2 is the last value in the range of colors; and displaying each color value on the computer screen at a color display location dependent upon the display location of each symbol.

43. The method of claim 41, wherein displaying each color value further comprises:

locating a color display area on a video screen dependent upon the display locations of the symbols;

dividing the color display area into at least one cell; and displaying in the cells on the video screen colors corresponding to the color values.

44. The method of claim 38, wherein the list of securities with the highest security momenta is displayed in the form of a bar chart.

45. A system, implemented in software on a digital computer, for depicting market activity, wherein the market activity is represented by a data stream, received through a communications port, the system comprising:

means for storing data representing a tick, wherein data representing a tick includes a tick time; and means for creating a display dependent upon the data representing a tick, wherein the display comprises colors dependent upon color values, the means for creating further comprising means for calculating the color values according to the formula:

color value=$((Y2-Y1)/(X2-X1))*(x-X1)+Y1$, wherein color value is the color value for display, x is a time difference between a current time and the tick time, the time difference lying within a range of time differences, the range of time differences having a first value in the range of time differences and a last value in the range of time differences, X1 is the first value in the range of time differences, X2 is the last value in the range of time differences, Y1 is a first value in a range of colors, the range of colors having the first value in the range of colors and a last value in the range of colors, and Y2 is the last value in the range of colors.

46. The system of claim 45 further comprising means for receiving the data stream.

47. The system of claim 46, wherein the data stream comprises NASDAQ Level II Quotes.

48. The system of claim 47, wherein ticks are represented by data in the NASDAQ Level II Quotes.

49. The system of claim 45, wherein a tick is a change in a quoted price for a security.

50. The system of claim 45, wherein the data representing ticks comprises a security symbol.

51. The system of claim 50, wherein the data representing ticks further comprises a tick direction.

52. The system of claim 50, wherein the data representing ticks further comprises a side.

53. The system of claim 47, wherein data representing a tick is received, means for storing data representing a tick further comprising means for storing the time the data representing the tick was received ("tick time") in a time array having a number of physical computer memory locations including a first memory location and a last memory location.

54. The system of claim 53 further comprising:
means for shifting the contents of the time array toward the last memory location,
thereby emptying the first memory location and overwriting the last memory location; and
means for storing the tick time in the first memory location.

55. The system of claim 53, wherein means for creating a display further comprises means for calculating a color value for each tick time stored in the time array, the color values being dependent upon the tick times.

56. The system of claim 55 further comprising means for periodically displaying colors corresponding to the color values.

57. The system of claim 53, wherein means for creating a display further comprises:
means for retrieving from computer memory the tick time stored in each memory location of the time array;
means for transforming each tick time in the time array into a color value; and
means for displaying each color value onto a computer screen.

58. The system of claim 53, wherein means for creating a display further comprises:
means for locating a display area on a video screen;
means for dividing the display area into at least one cell; and
means for displaying in the cells on the video screen colors corresponding to the color values.

59. The system of claim 58, wherein means for displaying colors in the cells on the video screen further comprises means for refreshing the display periodically.

60. The system of claim 58, wherein the means for dividing the display area into cells further comprises means for dividing the display area into a number of cells dependent upon the number of memory locations in the time array.

61. The system of claim 57, wherein the means for transforming each tick time in the time array further comprises:
means for calculating a time difference between a current time and the tick time stored in each memory location of the time array; and
means for transforming the time difference into a color value.

62. The system of claim 61, wherein the means for transforming the time differences into color values further comprises means for calculating a color value according to the formula:

color value=$((Y2-Y1)/(X2-X1))*(x-X1)+Y1$, wherein color value is the color value for display,
x is a time difference between the current time and the tick time stored in a memory location of the time array, the time difference lying within a range of time differences, the range of time differences having a first value in the range of time differences and a last value in the range of time differences, X1 is the first value in the range of time differences, X2 is the last value in the range of time differences, Y1 is the first value in a range of colors, the range of colors having a first value in the range of colors and a last value in the range of colors, and Y2 is the last value in the range of colors.

63. A system, implemented in software on a digital computer, for depicting market activity, wherein the market activity is represented by a data stream, received through a communications port, the system comprising:
means for storing data representing a tick, wherein data representing a tick includes a tick time; and
means for creating a display dependent upon the data representing a tick, the means for creating a display further comprising means for generating a list of top moving securities dependent upon the data representing a tick, the list of top moving securities comprising securities having the highest security momenta, the list comprising at least one listed security and a bottom listed security, the means for generating a list further comprising:
means for calculating from the stored tick times a security momentum for the security identified by the symbol in the data representing the tick ("the tick security"), said security momentum being a numeric indication of relative security price motion;
means for calculating a security momentum of the bottom listed security;
means for comparing the security momentum of the tick security with the security momentum of the bottom listed security;
means for replacing the bottom listed security with the tick security if the security momentum of the tick security is greater than the security momentum of the bottom listed security;
means for calculating, if the tick security is on the list, the security momentum for the security just above the tick security on the list;
means for comparing the security momentum of the security just above the tick security on the list and the security momentum of the tick security;
means for swapping the positions of the tick security and the security just above the tick security on the list if the momentum of the tick security is greater than the security momentum of the security just above the tick security on the list.

64. The system of claim 63, wherein the means for calculating from the stored tick times a security momentum further comprises:
means for calculating time differences between a current time and stored tick times; and
means for summing the calculated time differences.

65. The system of claim 63 further comprising means for displaying on a computer screen the list of securities with the highest security momenta, each security in the list having a display location on the computer screen.

66. The system of claim 65 further comprising:
means for transforming each stored tick time into a color value, further comprising means for calculating the color values according to the formula:

color value=$((Y2-Y1)/(X2-X1))*(x-X1)+Y1$, wherein color value is the color value for display, x is a time difference between a current time and the tick time, the time difference lying within a range of time differences, the range of time differences having a first value in the range of time differences and a last value in the range of time differences, X1 is the first value in the range of time differences, X2 is the last value in the range of time differences, Y1 is a first value in a range of colors, the range of colors having the first value in the range of colors and a last value in the range of colors, and Y2 is the last value in the range of colors; and means for displaying each color value on the computer screen at a color display location dependent upon the display location of each security in the list.

67. The system of claim 66, wherein means for displaying each color value further comprises:

means for locating a color display area on a video screen dependent upon the display locations of the securities in the list;

means for dividing the color display area into at least one cell; and means for displaying in the cells on the video screen colors corresponding to the color values.

68. The system of claim 65 further comprising means for displaying the list of securities with the highest security momenta in the form of text showing the symbols of the securities with the highest security momenta, each symbol having a display location on the computer screen.

69. The system of claim 68 further comprising:

means for transforming each stored tick time into a color value; and means for displaying each color value on the computer screen at a color display location dependent upon the display location of each symbol.

70. The system of claim 69, wherein means for displaying each color value further comprises:

means for locating a color display area on a video screen dependent upon the display location of the symbols;

means for dividing the color display area into at least one cell; and means for displaying in the cells on the video screen colors corresponding to the color values.

71. The system of claim 65, wherein the list of securities with the highest security momenta is displayed in the form of a bar chart.

72. The display of claim 1, said tick being a change in a quoted price for a security.

* * * * *